(12) United States Patent
Chamberlain et al.

(10) Patent No.: US 7,954,114 B2
(45) Date of Patent: May 31, 2011

(54) FIRMWARE SOCKET MODULE FOR FPGA-BASED PIPELINE PROCESSING

(75) Inventors: Roger D. Chamberlain, Saint Louis, MO (US); E. F. Berkley Shands, Kirkwood, MO (US); Benjamin C. Brodie, University City, MO (US); Michael Henrichs, Saint Louis, MO (US); Jason R. White, Manchester, MO (US)

(73) Assignees: Exegy Incorporated, St. Louis, MO (US); Washington University, St. Louis, MO (US)

( * ) Notice: Subject to any disclaimer, the term of this patent is extended or adjusted under 35 U.S.C. 154(b) by 977 days.

(21) Appl. No.: 11/339,892

(22) Filed: Jan. 26, 2006

(65) Prior Publication Data

US 2007/0174841 A1    Jul. 26, 2007

(51) Int. Cl.
G06F 9/44 (2006.01)
G06F 9/45 (2006.01)
G06F 13/00 (2006.01)
G06F 17/50 (2006.01)

(52) U.S. Cl. ........ 719/320; 719/327; 719/328; 716/116; 716/121; 716/128; 712/248; 326/39

(58) Field of Classification Search .......... 709/212–216; 710/1, 22, 29, 100, 305; 719/310–311
See application file for complete search history.

(56) References Cited

U.S. PATENT DOCUMENTS

| | | | |
|---|---|---|---|
| 3,601,808 A | 8/1971 | Vlack | |
| 3,611,314 A | 10/1971 | Pritchard et al. | |
| 3,729,712 A | 4/1973 | Glassman | |
| 3,824,375 A | 7/1974 | Gross et al. | |
| 3,848,235 A | 11/1974 | Lewis et al. | |
| 3,906,455 A | 9/1975 | Houston et al. | |
| 4,081,607 A | 3/1978 | Vitols et al. | |
| 4,298,898 A | 11/1981 | Cardot | |
| 4,314,356 A | 2/1982 | Scarbrough | |
| 4,385,393 A | 5/1983 | Chaure et al. | |
| 4,464,718 A | 8/1984 | Dixon et al. | |
| 4,550,436 A | 10/1985 | Freeman et al. | |

(Continued)

FOREIGN PATENT DOCUMENTS

EP    0 851 358 A    7/1998

(Continued)

OTHER PUBLICATIONS

International Search Report from corresponding PCT/US2007/060835.

(Continued)

*Primary Examiner* — Andy Ho
*Assistant Examiner* — Shih-Wei Kraft
(74) *Attorney, Agent, or Firm* — Thompson Coburn LLP

(57) ABSTRACT

A firmware socket module is deployed on a reconfigurable logic device, wherein the firmware socket module is configured to provide both commands and target data to an entry point in a data processing pipeline, wherein each command defines a data processing operation that is to be performed by the data processing pipeline, and wherein the target data corresponds to the data upon which the data processing pipeline performs its commanded data processing operation. Also, the firmware socket module may be configured to (1) access an external input descriptor pool buffer that defines an order in which commands and target data are to be provided to the data processing pipeline, and (2) transfer the commands and target data from an external memory to the data processing pipeline in accordance with the defined order.

77 Claims, 13 Drawing Sheets

U.S. PATENT DOCUMENTS

| | | | |
|---|---|---|---|
| 4,823,306 A | 4/1989 | Barbic et al. | |
| 4,941,178 A | 7/1990 | Chuang | |
| 5,023,910 A | 6/1991 | Thomson | |
| 5,050,075 A | 9/1991 | Herman et al. | |
| 5,101,424 A | 3/1992 | Clayton et al. | |
| 5,140,692 A | 8/1992 | Morita | |
| 5,163,131 A | 11/1992 | Row et al. | |
| 5,179,626 A | 1/1993 | Thomson | |
| 5,226,165 A | 7/1993 | Martin | |
| 5,243,655 A | 9/1993 | Wang | |
| 5,249,292 A | 9/1993 | Chiappa | |
| 5,255,136 A | 10/1993 | Machado et al. | |
| 5,265,065 A | 11/1993 | Turtle | |
| 5,270,922 A | 12/1993 | Higgins | |
| 5,319,776 A | 6/1994 | Hile et al. | |
| 5,327,521 A | 7/1994 | Savic et al. | |
| 5,339,411 A | 8/1994 | Heaton, Jr. | |
| 5,347,634 A | 9/1994 | Herrell et al. | |
| 5,371,794 A | 12/1994 | Diffie et al. | |
| 5,388,259 A | 2/1995 | Fleischman et al. | |
| 5,396,253 A | 3/1995 | Chia | |
| 5,404,488 A | 4/1995 | Kerrigan et al. | |
| 5,418,951 A | 5/1995 | Damashek | |
| 5,421,028 A | 5/1995 | Swanson | |
| 5,432,822 A | 7/1995 | Kaewell, Jr. | |
| 5,461,712 A | 10/1995 | Chelstowski et al. | |
| 5,465,353 A | 11/1995 | Hull et al. | |
| 5,481,735 A | 1/1996 | Mortensen et al. | |
| 5,488,725 A | 1/1996 | Turtle et al. | |
| 5,497,488 A | 3/1996 | Akizawa et al. | |
| 5,544,352 A | 8/1996 | Egger | |
| 5,546,578 A | 8/1996 | Takada | |
| 5,596,569 A | 1/1997 | Madonna et al. | |
| 5,651,125 A | 7/1997 | Witt et al. | |
| 5,701,464 A | 12/1997 | Aucsmith | |
| 5,712,942 A | 1/1998 | Jennings et al. | |
| 5,721,898 A | 2/1998 | Beardsley et al. | |
| 5,740,466 A | 4/1998 | Geldman | |
| 5,774,835 A | 6/1998 | Ozawa | |
| 5,774,839 A | 6/1998 | Shlomot | |
| 5,781,772 A | 7/1998 | Wilkinson, III et al. | |
| 5,781,921 A | 7/1998 | Nichols | |
| 5,805,832 A | 9/1998 | Brown et al. | |
| 5,813,000 A | 9/1998 | Furlani | |
| 5,819,273 A | 10/1998 | Vora et al. | |
| 5,819,290 A | 10/1998 | Fujita | |
| 5,826,075 A | 10/1998 | Bealkowski et al. | |
| 5,864,738 A | 1/1999 | Kessler et al. | |
| 5,884,286 A | 3/1999 | Daughtery, III | |
| 5,913,211 A | 6/1999 | Nitta | |
| 5,930,753 A | 7/1999 | Potamianos et al. | |
| 5,943,421 A | 8/1999 | Grabon | |
| 5,943,429 A | 8/1999 | Handel | |
| 5,978,801 A | 11/1999 | Yuasa | |
| 5,987,432 A | 11/1999 | Zusman et al. | |
| 5,991,881 A | 11/1999 | Conklin et al. | |
| 5,995,963 A | 11/1999 | Nanba et al. | |
| 6,006,264 A | 12/1999 | Colby et al. | |
| 6,023,760 A | 2/2000 | Karttunen | |
| 6,028,939 A | 2/2000 | Yin | |
| 6,044,407 A | 3/2000 | Jones et al. | |
| 6,058,391 A | 5/2000 | Gardner | |
| 6,061,662 A | 5/2000 | Makivic | |
| 6,064,739 A | 5/2000 | Davis | |
| 6,067,569 A | 5/2000 | Khaki et al. | |
| 6,070,172 A | 5/2000 | Lowe | |
| 6,073,160 A | 6/2000 | Grantham et al. | |
| 6,084,584 A | 7/2000 | Nahi et al. | |
| 6,105,067 A | 8/2000 | Batra | |
| 6,134,551 A | 10/2000 | Aucsmith | |
| 6,138,176 A | 10/2000 | McDonald et al. | |
| RE36,946 E | 11/2000 | Diffie et al. | |
| 6,147,976 A | 11/2000 | Shand et al. | |
| 6,169,969 B1 | 1/2001 | Cohen | |
| 6,173,276 B1 | 1/2001 | Kant et al. | |
| 6,175,874 B1 | 1/2001 | Imai et al. | |
| 6,226,676 B1 | 5/2001 | Crump et al. | |
| 6,263,321 B1 | 7/2001 | Daughtery, III | |
| 6,279,113 B1 | 8/2001 | Vaidya | |
| 6,279,140 B1 | 8/2001 | Slane | |
| 6,317,795 B1 | 11/2001 | Malkin et al. | |
| 6,321,258 B1 | 11/2001 | Stollfus et al. | |
| 6,336,150 B1 | 1/2002 | Ellis et al. | |
| 6,339,819 B1 * | 1/2002 | Huppenthal et al. | 712/16 |
| 6,370,592 B1 | 4/2002 | Kumpf | |
| 6,370,645 B1 | 4/2002 | Lee | |
| 6,377,942 B1 | 4/2002 | Hinsley et al. | |
| 6,381,242 B1 | 4/2002 | Maher, III et al. | |
| 6,389,532 B1 | 5/2002 | Gupta et al. | |
| 6,397,259 B1 | 5/2002 | Lincke et al. | |
| 6,397,335 B1 | 5/2002 | Franczek et al. | |
| 6,412,000 B1 | 6/2002 | Riddle et al. | |
| 6,418,419 B1 | 7/2002 | Nieboer et al. | |
| 6,430,272 B1 | 8/2002 | Maruyama et al. | |
| 6,456,982 B1 | 9/2002 | Pilipovic | |
| 6,463,474 B1 | 10/2002 | Fuh et al. | |
| 6,499,107 B1 | 12/2002 | Gleichauf et al. | |
| 6,546,375 B1 | 4/2003 | Pang et al. | |
| 6,578,147 B1 | 6/2003 | Shanklin et al. | |
| 6,581,098 B1 | 6/2003 | Kumpf | |
| 6,601,094 B1 | 7/2003 | Mentze et al. | |
| 6,625,150 B1 | 9/2003 | Yu | |
| 6,704,816 B1 * | 3/2004 | Burke | 710/100 |
| 6,711,558 B1 | 3/2004 | Indeck et al. | |
| 6,765,918 B1 | 7/2004 | Dixon et al. | |
| 6,772,136 B2 | 8/2004 | Kant et al. | |
| 6,772,345 B1 | 8/2004 | Shetty | |
| 6,778,968 B1 | 8/2004 | Gulati | |
| 6,785,677 B1 | 8/2004 | Fritchman | |
| 6,804,667 B1 | 10/2004 | Martin | |
| 6,807,156 B1 | 10/2004 | Veres et al. | |
| 6,820,129 B1 | 11/2004 | Courey, Jr. | |
| 6,847,645 B1 | 1/2005 | Potter et al. | |
| 6,870,837 B2 | 3/2005 | Ho et al. | |
| 6,877,044 B2 | 4/2005 | Lo et al. | |
| 6,886,103 B1 | 4/2005 | Brustoloni et al. | |
| 6,901,461 B2 | 5/2005 | Bennett | |
| 6,931,408 B2 | 8/2005 | Adams et al. | |
| 6,931,545 B1 | 8/2005 | Ta et al. | |
| 6,944,168 B2 | 9/2005 | Paatela et al. | |
| 6,978,223 B2 | 12/2005 | Milliken | |
| 6,980,976 B2 | 12/2005 | Alpha et al. | |
| 6,981,054 B1 | 12/2005 | Krishna | |
| 7,019,674 B2 | 3/2006 | Cadambi et al. | |
| 7,024,384 B2 | 4/2006 | Daughtery, III | |
| 7,093,023 B2 | 8/2006 | Lockwood et al. | |
| 7,101,188 B1 | 9/2006 | Summers et al. | |
| 7,103,569 B1 | 9/2006 | Groveman et al. | |
| 7,117,280 B2 | 10/2006 | Vasudevan | |
| 7,127,510 B2 | 10/2006 | Yoda et al. | |
| 7,139,743 B2 | 11/2006 | Indeck et al. | |
| 7,167,980 B2 | 1/2007 | Chiu | |
| 7,181,437 B2 | 2/2007 | Indeck et al. | |
| 7,181,608 B2 | 2/2007 | Fallon et al. | |
| 7,222,114 B1 | 5/2007 | Chan et al. | |
| 7,224,185 B2 | 5/2007 | Campbell et al. | |
| 7,225,188 B1 | 5/2007 | Gai et al. | |
| 7,257,842 B2 | 8/2007 | Barton et al. | |
| 7,286,564 B2 | 10/2007 | Roberts | |
| 7,305,383 B1 | 12/2007 | Kubesh et al. | |
| 7,305,391 B2 | 12/2007 | Wyschogrod et al. | |
| 7,363,277 B1 | 4/2008 | Dutta et al. | |
| 7,408,932 B2 | 8/2008 | Kounavis et al. | |
| 7,411,957 B2 | 8/2008 | Stacy et al. | |
| 7,420,931 B2 | 9/2008 | Nanda et al. | |
| 7,444,515 B2 | 10/2008 | Dharmapurikar et al. | |
| 7,454,418 B1 | 11/2008 | Wang | |
| 7,457,834 B2 | 11/2008 | Jung et al. | |
| 7,461,064 B2 | 12/2008 | Fontoura et al. | |
| 7,467,155 B2 | 12/2008 | McCool et al. | |
| 7,478,431 B1 | 1/2009 | Nachenberg | |
| 7,480,253 B1 | 1/2009 | Allan | |
| 7,487,327 B1 * | 2/2009 | Chang et al. | 711/203 |
| 7,496,108 B2 | 2/2009 | Biran et al. | |
| 7,558,925 B2 | 7/2009 | Bouchard et al. | |
| 7,587,476 B2 | 9/2009 | Sato | |
| 7,617,291 B2 | 11/2009 | Fan et al. | |

| | | | |
|---|---|---|---|
| 7,636,703 B2 | 12/2009 | Taylor | |
| 7,685,121 B2 | 3/2010 | Brown et al. | |
| 2001/0014093 A1 | 8/2001 | Yoda et al. | |
| 2001/0052038 A1* | 12/2001 | Fallon et al. | 710/68 |
| 2001/0056547 A1 | 12/2001 | Dixon | |
| 2002/0031125 A1 | 3/2002 | Sato | |
| 2002/0069370 A1 | 6/2002 | Mack | |
| 2002/0082967 A1 | 6/2002 | Kaminsky et al. | |
| 2002/0095512 A1 | 7/2002 | Rana et al. | |
| 2002/0105911 A1 | 8/2002 | Pruthi et al. | |
| 2002/0129140 A1 | 9/2002 | Peled et al. | |
| 2002/0150248 A1 | 10/2002 | Kovacevic | |
| 2002/0162025 A1 | 10/2002 | Sutton et al. | |
| 2002/0166063 A1 | 11/2002 | Lachman et al. | |
| 2002/0169873 A1 | 11/2002 | Zodnik | |
| 2003/0009693 A1 | 1/2003 | Brock et al. | |
| 2003/0014521 A1 | 1/2003 | Elson et al. | |
| 2003/0014662 A1 | 1/2003 | Gupta et al. | |
| 2003/0018630 A1 | 1/2003 | Indeck et al. | |
| 2003/0023876 A1 | 1/2003 | Bardsley et al. | |
| 2003/0037037 A1 | 2/2003 | Adams et al. | |
| 2003/0043805 A1 | 3/2003 | Graham et al. | |
| 2003/0051043 A1 | 3/2003 | Wyschogrod et al. | |
| 2003/0055658 A1 | 3/2003 | RuDusky | |
| 2003/0055770 A1 | 3/2003 | RuDusky | |
| 2003/0055771 A1 | 3/2003 | RuDusky | |
| 2003/0065943 A1 | 4/2003 | Geis et al. | |
| 2003/0074582 A1 | 4/2003 | Patel et al. | |
| 2003/0093347 A1 | 5/2003 | Gray | |
| 2003/0097481 A1* | 5/2003 | Richter | 709/251 |
| 2003/0099254 A1* | 5/2003 | Richter | 370/466 |
| 2003/0110229 A1 | 6/2003 | Kulig et al. | |
| 2003/0115485 A1 | 6/2003 | Milliken | |
| 2003/0126065 A1 | 7/2003 | Eng et al. | |
| 2003/0163715 A1 | 8/2003 | Wong | |
| 2003/0177253 A1 | 9/2003 | Schuehler et al. | |
| 2003/0221013 A1 | 11/2003 | Lockwood et al. | |
| 2004/0019703 A1 | 1/2004 | Burton | |
| 2004/0028047 A1 | 2/2004 | Hou et al. | |
| 2004/0034587 A1 | 2/2004 | Amberson et al. | |
| 2004/0049596 A1 | 3/2004 | Schuehler et al. | |
| 2004/0054924 A1 | 3/2004 | Chuah et al. | |
| 2004/0064737 A1 | 4/2004 | Milliken et al. | |
| 2004/0100977 A1 | 5/2004 | Suzuki et al. | |
| 2004/0105458 A1 | 6/2004 | Ishizuka | |
| 2004/0111632 A1 | 6/2004 | Halperin | |
| 2004/0162826 A1 | 8/2004 | Wyschogrod et al. | |
| 2004/0177340 A1 | 9/2004 | Hsu et al. | |
| 2004/0186804 A1 | 9/2004 | Chakraborty et al. | |
| 2004/0186814 A1 | 9/2004 | Chalermkraivuth et al. | |
| 2004/0196905 A1 | 10/2004 | Yamane et al. | |
| 2004/0199448 A1 | 10/2004 | Chalermkraivuth et al. | |
| 2004/0205149 A1 | 10/2004 | Dillon et al. | |
| 2005/0005145 A1 | 1/2005 | Teixeira | |
| 2005/0033672 A1 | 2/2005 | Lasry et al. | |
| 2005/0044344 A1* | 2/2005 | Stevens | 712/227 |
| 2005/0086520 A1 | 4/2005 | Dharmapurikar et al. | |
| 2005/0091142 A1 | 4/2005 | Renton et al. | |
| 2005/0097027 A1 | 5/2005 | Kavanaugh | |
| 2005/0131790 A1 | 6/2005 | Benzschawel et al. | |
| 2005/0175010 A1 | 8/2005 | Wilson et al. | |
| 2005/0187844 A1 | 8/2005 | Chalermkraivuth et al. | |
| 2005/0187845 A1 | 8/2005 | Eklund et al. | |
| 2005/0187846 A1 | 8/2005 | Subbu et al. | |
| 2005/0187847 A1 | 8/2005 | Bonissone et al. | |
| 2005/0187848 A1 | 8/2005 | Bonissone et al. | |
| 2005/0187849 A1 | 8/2005 | Bollapragada et al. | |
| 2005/0187974 A1 | 8/2005 | Gong | |
| 2005/0195832 A1 | 9/2005 | Dharmapurikar et al. | |
| 2005/0197938 A1 | 9/2005 | Davie et al. | |
| 2005/0197939 A1 | 9/2005 | Davie et al. | |
| 2005/0197948 A1 | 9/2005 | Davie et al. | |
| 2005/0216384 A1 | 9/2005 | Partlow et al. | |
| 2005/0229254 A1 | 10/2005 | Singh et al. | |
| 2005/0267836 A1 | 12/2005 | Crosthwaite et al. | |
| 2005/0283423 A1 | 12/2005 | Moser et al. | |
| 2006/0020536 A1 | 1/2006 | Renton et al. | |
| 2006/0031154 A1 | 2/2006 | Noviello et al. | |
| 2006/0031156 A1 | 2/2006 | Noviello et al. | |
| 2006/0031263 A1 | 2/2006 | Arrouye et al. | |
| 2006/0047636 A1 | 3/2006 | Mohania et al. | |
| 2006/0053295 A1 | 3/2006 | Madhusudan et al. | |
| 2006/0059064 A1 | 3/2006 | Glinberg et al. | |
| 2006/0059065 A1 | 3/2006 | Glinberg et al. | |
| 2006/0059066 A1 | 3/2006 | Glinberg et al. | |
| 2006/0059067 A1 | 3/2006 | Glinberg et al. | |
| 2006/0059068 A1 | 3/2006 | Glinberg et al. | |
| 2006/0059069 A1 | 3/2006 | Glinberg et al. | |
| 2006/0059083 A1 | 3/2006 | Friesen et al. | |
| 2006/0129745 A1 | 6/2006 | Thiel et al. | |
| 2006/0143099 A1 | 6/2006 | Partlow et al. | |
| 2006/0242123 A1 | 10/2006 | Williams, Jr. | |
| 2006/0269148 A1 | 11/2006 | Farber et al. | |
| 2006/0294059 A1 | 12/2006 | Chamberlain et al. | |
| 2007/0011183 A1 | 1/2007 | Langseth et al. | |
| 2007/0011687 A1 | 1/2007 | Ilik et al. | |
| 2007/0061594 A1 | 3/2007 | Ginter et al. | |
| 2007/0067108 A1 | 3/2007 | Buhler et al. | |
| 2007/0078837 A1 | 4/2007 | Indeck et al. | |
| 2007/0112837 A1 | 5/2007 | Houh et al. | |
| 2007/0118500 A1 | 5/2007 | Indeck et al. | |
| 2007/0130140 A1 | 6/2007 | Cytron et al. | |
| 2007/0237327 A1 | 10/2007 | Taylor et al. | |
| 2007/0260602 A1 | 11/2007 | Taylor | |
| 2007/0277036 A1 | 11/2007 | Chamberlain et al. | |
| 2007/0294157 A1 | 12/2007 | Singla et al. | |
| 2008/0086274 A1 | 4/2008 | Chamberlain et al. | |
| 2008/0109413 A1 | 5/2008 | Indeck et al. | |
| 2008/0114724 A1 | 5/2008 | Indeck et al. | |
| 2008/0114725 A1 | 5/2008 | Indeck et al. | |
| 2008/0114760 A1 | 5/2008 | Indeck et al. | |
| 2008/0126320 A1 | 5/2008 | Indeck et al. | |
| 2008/0133453 A1 | 6/2008 | Indeck et al. | |
| 2008/0133519 A1 | 6/2008 | Indeck et al. | |
| 2009/0262741 A1 | 10/2009 | Jungck et al. | |

FOREIGN PATENT DOCUMENTS

| | | |
|---|---|---|
| EP | 0 880 088 | 11/1998 |
| EP | 0 887 723 | 12/1998 |
| EP | 0 911 738 A | 4/1999 |
| JP | 2000286715 A | 10/2000 |
| JP | 2002101089 A | 4/2002 |
| WO | 9955052 | 10/1999 |
| WO | 00/41136 | 7/2000 |
| WO | WO 01/22425 A | 3/2001 |
| WO | 0139577 | 6/2001 |
| WO | 0161913 | 8/2001 |
| WO | 0180558 | 10/2001 |
| WO | WO 01/80082 A2 | 10/2001 |
| WO | 02061525 | 8/2002 |
| WO | 02082271 | 10/2002 |
| WO | 03100650 | 4/2003 |
| WO | 03036845 | 5/2003 |
| WO | 03100662 | 12/2003 |
| WO | 2004017604 | 2/2004 |
| WO | WO 2004042560 A2 | 5/2004 |
| WO | WO 2004042561 A2 | 5/2004 |
| WO | WO 2004042562 A2 | 5/2004 |
| WO | WO 2004042574 A2 | 5/2004 |
| WO | 2005017708 | 2/2005 |
| WO | WO 2005 017708 A2 | 2/2005 |
| WO | 2005026925 | 3/2005 |
| WO | 2005048134 A | 5/2005 |
| WO | 2006023948 | 3/2006 |
| WO | 2006096324 | 9/2006 |
| WO | 2007064685 | 6/2007 |
| WO | 2008022036 | 2/2008 |

OTHER PUBLICATIONS

Anonymous, "Method for Allocating Computer Disk Space to a File of Known Size," IBM Technical Disclosure Bulletin, vol. 27, No. IOB, Mar. 1, 1985, New York.

Arnold et al., "The Splash 2 Processor and Applications", Proceedings 1993 IEEE International Conference on Cornputer Design: VLSI Iii Computers and Processors (ICCD '93); Oct. 3, 1993; pp. 482-485; IEEE Computer Society; Cambridge, MA USA.

Berk, "JLex: A lexical analyzer generator for JavaTM", downloaded from http://www.cs.princeton.edu/~appel/modernljava/Jlex/ in Jan. 2002, pp. 1-18.

Braun et al., "Layered Protocol Wrappers for Internet Packet Processing in Reconfigurable Hardware", Proceedings of Hot Interconnects 9 (Hotl-9) Stanford, CA, Aug. 22-24, 2001, pp. 93-97.

Choi et al., "Design of a Flexible Open Platform for High Performance Active Networks", Allerton Conference, Campaign, II, 1999.

Cloutier et al., "VIP: An FPGA-Based Processor for Image Processing and Neural Networks", Proceedings of Fifth International Conference on Microelectronics for Neural Networks, Feb. 12, 1996; pp. 330-336; Los Alarnitos, California.

Compton et al., "Configurable Computing: A Survey of Systems and Software", Technical Report, Northwestern University, Dept. of BCE, 1999.

Ebeling et al., "RaPiD-Reconfigurable Pipelined Datapath", University of Washington, Dept. of Computer Science and Engineering, Sep. 23, 1996; Seattle, WA.

Franklin et al., "Assisting Network Intrusion Detection with Reconfigurable Hardware", Symposium on Field-Programmable Custom Computing Machines (FCCM 2002), Apr. 2002, Napa, California.

Fu et al., "The FPX KCPSM Module: An Embedded, Reconfigurable Active Processing Module for the Field Programmable Port Extender (FPX)", Washington University, Department of Computer Science, Technical Report WUCS-01-14, Jul. 2001.

Gunther et al., "Assessing Document Relevance with Run-Time Reconfigurable Machines", 1996; Proceedings, IEEE Symposium on Napa Valley, CA, Apr. 17, 1996.

Hauck et al., "Software Technologies for Reconfigurable Systems", Northwestern University, Dept. of BCE, Technical Report, 1996.

Hezel et al., "FPGA-based Template Matching using Distance Transforms", Proceedings of the 10th Annual IEEE Symposium on Field-Programmable Custom Computing Machines (FCCM '02); Apr. 22, 2002; pp. 89-97; IEEE Computer Society, USA.

Hollaar, "Hardware Systems for Text information Retrieval", Proceedings of the Sixth Annual International ACM Sigir Conference on Research and Development in Information Retrieval; Jun. 6-8, 1983; pp. 3-9; Baltimore, Maryland, USA.

Keutzer et al., "A Survey of Programmable Platforms-Network Proc", University of California-Berkeley, pp. 1-29.

Kulig et al., "System an Method for Controlling Transmission of Data Packets Over an Information Network", pending U.S. Patent Application.

Lin et al., "Real-Time Image Template Matching Based on Systolic Array Processor", International Journal of Electronics; Dec. 1, 1992; pp. 1165-1176; vol. 73, No. 6; London, Great Britain.

Lockwood et al., "Field Programmable Port Extender (FPX) for Distributed Routing and Queuing", ACM International Symposium on Field Programmable Gate Arrays (FPGA '2000), Monterey, CA, Feb. 2000, pp. 1-8.

Lockwood et al., "Hello, World: A Simple Application for the Field Programmable Port Extender (FPX)", Washington University, Department of Computer Science, Technical Report WUCS-TM-00-12, Jul. 11, 2000, pp. 1-14.

Lockwood et al., "Parallel FPGA Programming over Backplane Chassis", Wshington University, Department of Computer Science, Technical Report WUCS-TM-00-11, Jun. 12, 2000, pp. 1-12.

Lockwood et al., "Reprogramable Network Packet Processing on the Field Programmable Port Extender (FPX)", ACM International Symposium on Field Programmable Gal Arrays (FPGA '2001), Monterey, Ca, Feb. 2001, pp. 87-93.

Lockwood, "An Open Platform for Development of Network Processing Modules in Reprogrammable Hardware", IEG DesignCon 2001, Santa Clara, CA, Jan. 2001, Paper WB-19, pp. 1-10.

Lockwood, "Building Networks with Reprogrammable Hardware", Field Programmable Port Extender (FPX); Jan. 2002 Gigabit Workshop Tutorial, Washington University, St. Louis, MO, Jan. 3-4, 2002.

Lockwood, "Evolvable Internet Hardware Platforms", NASA/DoD Workshop on Evolvable Hardware (EHW'0I), Long Beach, CA, Jul. 12-14, 2001, pp. 1-9.

Lockwood, "Hardware Laboratory Configuration", Field Programmable Port Extender: Jan. 2002 Gigabit Workshop Tutorial,, Washington University, St. Louis, MO, Jan. 3-4, 2002.

Lockwood, "Introduction", Field Programmable Port Extender: Jan. 2002 Gigabit Workshop Tutorial, Washington University, St. Louis, MO, Jan. 3-4, 2002.

Lockwood, "Platform and Methodology for Teaching Design of Hardware Modules in Internet Routers and Firewalls", IEEE Computer Society International Conference on Microelectronic Systems Education (MSE'2001), Las Vega, NV, Jun. 17-18, 2001, pp. 56-57.

Lockwood, "Protocol Processing on the FPX", Field Programmable Port Extender: Jan. 2002 Gigabit Workshop Tutorial, Washington University, St. Louis, MO, Jan. 3-4, 2002.

Lockwood, "Simulation and Synthesis", Field Programmable Port Extender (FPX); Jan. 2002 Gigabit Workshop Tutorial, Washington University, St. Louis, MO, Jan. 3-4, 2002.

Lockwood, "Simulation of the Hello World Application for the Field-Programmable Port Extender (FPX)", Washington University, Applied Research Lab, Spring 2001 Gigabits Kits Workshop.

"Lucent Technologies Delivers 'PayloadPlus' Network Processors for Programmable, MultiProtocol, OC-48c Processing", Lucent Technologies Press Release, downloaded from http://www.lucent.comlpress/1000/0010320.meb.html on Mar. 21, 2002.

Mosanya et al., "A FPGA-Based Hardware Implementation of Generalized Profile Search Using Online Artithmetic", ACM/Sigda International Symposium on Field Programmable Gate Arrays (FPGA '99); Feb. 21-23, 1999; pp. 101-111; Monterey, CA, USA.

Moscola et al., "FPGrep and FPSed: Regular Expression Search and Substitution for Packet Streaming in Field Programmable Hardware", unpublished, pp. 1-19.

Nunez et al., "The X-MatchLITE FPGA-Based Data Compressor", Buromicro Conference 1999, Proceedings, Italy, Sep. 8-10, 1999, Los Alamitos, CA, pp. 126-132.

"Overview, Field Programmable Port Extender", Jan. 2002 Gigabit Workshop Tutorial, Washington University, St. Louis, MO, Jan. 3-4, 2002, pp. 1-4.

Partial International Search for PCT/US 03/15638; Feb. 3, 2004.

Patent Cooperation Treaty; International Search Report for PCT/US 03/15638; mail date: May 6, 2004.

Patent Cooperation Treaty; International Search Report for PCT/US2004/016398; mail date: Apr. 12, 2005.

Patent Cooperation Treaty; International Search Report for PCT/US 01/11255; maild date: Jul. 10, 2003.

"Payload Plus Agere System Interface," Agere Systems Product Brief, Jun. 2001, downloaded from Internet, Jan. 2002, pp. 1-6.

Pramanik et al., "A Hardware Pattern Matching Algorithm on a Dataflow", Computer Journal; Jul. 1, 1985; pp. 264-269; vol. 28, No. 3; Oxford University Press, Surrey, Great Britain.

Ratha et al., "Convolution on Splash 2", Proceedings of IEEE Symposium on FPGAS for Custom Computing Machines, Apr. 19, 1995; pp. 204-213; Los Alamitos, California.

Schmit, "Incremental Reconfiguration for Pipelined Applications", Dept. of ECE, Carnegie Mellon University 1997, Pittsburgh, PA, pp. 47-55.

Shah, "Understanding Network Processors", Version 1.0, Univesity of California-Berkeley, Sep. 4, 2001.

Shirazi et al. "Quantitative Analysis of FPGA-based Database Searching", Journal of VLSI Signal Processing Systems For Signal, Image, and Video Technology; May 2001; pp. 85-96; vol. 28, No. 1/2; Kluwer Academic Publishers; Dordrecht, NL.

Sidhu et al., "Fast Regular Expression Mathching using FPGAs", IEEE Symposium on Field Programmable Custom Computing Machines (FCCM 2001), Apr. 2001.

Sidhu et al., "String Matching on Multicontext FPGAs using Self-Reconfiguration", FPGA '99: Proceedings of the 1999 ACM/SIGDA 7th International Symposium on Field Programmbable Gate Arrays, Feb. 1999, pp. 217-226.

Taylor et al., "Generalized RAD Module Interface Specification of the Field Programmable Port Extender (FPX) Version 2", Washington University, Department of Computer Science, Technical Report, Jan. 8, 2000, pp. 1-10.

Taylor et al., "Modular Design Techniques for the FPX", Field Programmable Port Extender, Jan. 2002 Gigabit Workshop Tutorial, Washington University, St. Louis, MO, Jan. 3-4, 2002.

"The Field-Programmable Port Extender (FPX)", downloaded from http://www.arl.wustl.edu/arl/ in Mar. 2002.

Villasenor et al., "Configurable Computing Solutions For Automatic Target Recognition", FPGAS for Custom Computing Machines, 1996,Proceedings, IEEE Symposium on Napa Valley, CA; Apr. 17-19, 1996; pp. 70-79; 1996 IEEE; Napa Valley, CA, Los Alamitos, CA, USA.

Yamaguchi et al., "High Speed Homology Search with FPGAs", Proceedings Pacific Symposium on Biocomputing; Jan. 3-7, 2002; pp. 271-282; vol. 7; Online; Lihue, Hawaii, USA.

Baer, "Computer Systems Architecture", 1980, pp. 262-265, Computer Science Press, Inc., Potomac, Maryland.

Baeza-Yates and Navarro, "New and Faster Filters for Multiple Approximate String Matching", Random Structures and Algorithms (RSA), vol. 20, No. 1, Jan. 2002, pp. 23-49.

Hayes, "Computer Architecture and Organization", Second Edition; 1988; pp. 448-459, McGraw-Hill, Inc.

Navarro, "A Guided Tour to Approximate String Matching", ACM Computing Surveys, vol. 33, No. 1, Mar. 2001, pp. 31-88.

Ramakrishna et al., "A Performance Study of Hashing Functions for Hardware Applications", Int. Conf. on Computing and Information, vol. 1, No. 1, May 1994, pp. 1621-1636.

Taylor and Turner, "Scalable Packet Classification using Distributed Crossproducting of Field Labels", Proceedings of IEEE Infocom, vol. 20, No. 1, Mar. 2005, pp. 1-12.

Taylor, "Models, Algorithms, and Architectures for Scalable Packet Classification", doctoral thesis, Department of Computer Science and Engineering, Washington University, St. Louis, MO, Aug. 2004, pp. 1-201.

Aldwairi et al., "Configurable String Matching Hardware for Speeding up Intrusion Detection", SIRARCH Comput. Archit. News, vol. 33, No. 1, pp. 99-107, Mar. 2005.

Baker et al., "High-throughput Linked-Pattern Matching for Intrusion Detecting Systems", ANCS 2005: Proceedings of the 2005 Symposium on Architecture for Networking and Communications Systems, pp. 193-202, ACM Press, 2005.

Behrens et al., "BLASTN Redundancy Filter in Reprogrammable Hardware," Final Project Submission, Fall 2003, Department of Computer Science and Engineering, Washington University.

Cavnar et al., "N-Gram-Based Text Categorization", Proceedings of SDAIR-94, 3rd Annual Symposium on Document Analysis and Information Retrieval, Las Vegas, pp. 161-175, 1994.

Chamberlain et al., "Achieving Real Data Throughput for an FPGA Co-Processor on Commodity Server Platforms", Proc. of 1st Workshop on Building Block Engine Architectures for Computers and Networks, Oct. 2004, Boston, MA.

Cho et al., "Deep Packet Filter with Dedicated Logic and Read Only Memories", 12th Annual IEEE Symposium on Field-Programmable Custom Computing Machines, Apr. 2004.

Chodowiec et al., "Fast Implementations of Secret-Key Block Ciphers Using Mixed Inter- and Outer-Round Pipelining", Proceedings of International Symposium on FPGAs, pp. 94-102 (Feb. 2001).

Cholleti, "Storage Allocation in Bounded Time", MS Thesis, Dept. of Computer Science and Engineering, Washington University, St. Louis, MO (Dec. 2002). Available as Washington University Technical Report WUCSE-2003-2.

Clark et al., "Scalable Pattern Matching for High Speed Networks", Proceedings of the 12th Annual IEEE Symposium on Field-Programmable Custom Computing Machines, 2004; FCCM 2004; Apr. 20-23, 2004; pp. 249-257; IEEE Computer Society; Cambridge, MA USA.

Compton et al., "Reconfigurable Computing: A Survey of Systems and Software", Technical Report, Northwestern University, Dept. of ECE, 1999, presented by Yi-Gang Tai.

Cong et al., "An Optimal Technology Mapping Algorithm for Delay Optimization in Lookup-Table Based FPGA Designs", IEEE, 1992, pp. 48-53.

Dharmapurikar et al., "Deep Packet Inspection Using Parallel Bloom Filters," IEEE Micro, Jan.-Feb. 2004, vol. 24, Issue: 1, pp. 52-61.

Forgy, "RETE: A fast algorithm for the many pattern/many objet pattern matching problem", Artificial Intelligence, 19, pp. 17-37, 1982.

Franklin et al., "An Architecture for Fast Processing of Large Unstructured Data Sets." Proc. of 22nd Int'l Conf. on Computer Design, Oct. 2004, pp. 280-287.

Gavrila et al., "Multi-feature Hierarchical Template Using Distance Transforms", IEEE, Aug. 16-20, 1998, vol. 1, pp. 439-444.

Guerdoux-Jamet et al., Systolic Filter for Fast DNA Similarity Search, IEEE, 1995, pp. 145-156.

Gyang, "NCBI BLASTN Stage 1 in Reconfigurable Hardware," Technical Report WUCSE-2005-30, Aug. 2004, Department of Computer Science and Engineering, Washington University, St. Louis, MO.

Halaas et al., "A Recursive MISD Architecture for Pattern Matching", IEEE Transactions on Very Large Scale Integration, vol. 12, No. 7, pp. 727-734, Jul. 2004.

Herbordt et al., "Single Pass, BLAST-Like, Approximate String Matching on FPGAs", 14th Annual IEEE Symposium on Field-Programmable Custom Computing Machines (FCCM'06), Apr. 2006, pp. 1-10, IEEE.

Hutchings et al., "Assisting Network Intrusion Detection with Reconfigurable Hardware", FCCM 2002: 10th Annual IEEE Symposium on Field-Programmable Custom Computing Machines, 2002.

International Search Report for PCT/US2004/016021 dated Aug. 18, 2005.

Krishnamurthy et al., "Biosequence Similarity Search On The Mercury System", Proceedings of the 15th IEEE International Conference on Application-Specific Systems, Architectures, and Processors (ASAP04), Sep. 2004, pp. 365-375.

Lancaster et al., "Acceleration of Ungapped Extension in Mercury BLAST", Seventh (7th) Workshop on Media and Streaming Processors, Nov. 12, 2005, Thirty-Eighth (38th) International Symposium on Microarchitecture (MICRO-38), Barcelona, Spain.

Lancaster, "Design and Evaluation of a BLAST Ungapped Extension Accelerator, Master's Thesis, May 2006", Thesis (http://cse.seas.wustl.edu/Research/File Download.asp?489), 2006, pp. Cover pp. 1-4; iii-x; pp. 1-65, Washington University in St. Louis.

Moscola, "FPGrep and FPSed: Packet Payload Processors for Managing the Flow of Digital Content on Local Area Networks and the Internet", Master's Thesis, Sever Institute of Technology, Washington University, St. Louis, MO, Aug. 2003.

Pirsch et al., "VLSI Architectures for Video Compression—A Survey", Proceedings of the IEEE, Feb. 1995, pp. 220-243, vol. 83, No. 2, Institute of Electrical and Electronics Engineers, Washington, DC, USA.

Ramakrishna et al., "Efficient Hardware Hashing Functions for High Performance Computers", IEEE Transactions on Computers, Dec. 1997, vol. 46, No. 12.

Ratha et al., "FPGA-based coprocessor for text string extraction", IEEE, Sep. 11-13, 2000, pp. 217-221.

Roesch, "Snort—Lightweight Intrusion Detection for Networks", Proceedings of LISA '99: 13th Systems Administration Conference; Nov. 7-12, 1999; pp. 229-238; USENIX Association, Seattle, WA USA.

Roy, "A bounded search algorithm for segmented channel routing for FPGA's and associated channel architecture issues", IEEE, Nov. 11, 1993, pp. 1695-1705, vol. 12.

Sourdis and Pnevmatikatos, "Fast, Large-Scale String Match for a 10Gbps FPGA-based Network Intrusion Detection System", 13th International Conference on Field Programmable Logic and Applications, 2003.

Tan et al., "A High Throughput String Matching Architecture for Intrusion Detection and Prevention", ISCA 2005: 32nd Annual International Symposium on Computer Architecture, pp. 112-122, 2005.

Ward et al., "Dynamically Reconfigurable Computing: A Novel Computation Technology with Potential to Improve National Security Capabilities", May 15, 2003, A White Paper Prepared by Star Bridge Systems, Inc. [retrieved Dec. 12, 2006]. Retrieved from the Internet: <URL: http://www.starbridgesystems.com/resources/whitepapers/Dynamically%20Reconfigurabl%20Computing.pdf.

Written Opinion for PCT/US2007/060835 dated Jul. 9, 2007.

"A Proposal to the MITRE Corporation", Jan. 26, 2005, pp. 1-5.

"DSSI FPGA Testing Results", Nov. 5, 2004, pp. 1-4.

"Pre-Release Evaluation Agreement", 2004, pp. 1-3.

"Technology Overview", downloaded from the http://www.datasearchsystems.com/tech.htm on Apr. 19, 2004.

Braun et al., "Protocol Wrappers for Layered Network Packet Processing in Reconfigurable Hardware", IEEE Micro, Jan.-Feb. 2002, pp. 66-74.

Chamberlain et al., "The Mercury System: Embedding Computation Into Disk Drives", 7th High Performance Embedded Computing Workshop, Sep. 2003, Boston, MA.

Chamberlain et al., "The Mecury System: Exploiting Truly Fast Hardware for Data Search", Proc. of Workshop on Storage Network Architecture and Parallel I/Os, Sep. 2003, New Orleans, LA.

Dharmapurikar, "Fast and Scalable Pattern Matching for Content Filtering", ACM, ANCS 05, 2005, pp. 183-192.

Office Action for EP07762449.2 dated Feb. 26, 2009, 3 pages.

Office Action Response for EP07762449.2 dated Jul. 7, 2009, 12 pages.

West et al., "An FPGA-Based Search Engine for Unstructured Database", Proc. of 2nd Workshop on Application Specific Processors, Dec. 2003, San Diego, CA.

Nwodoh et al., "A Processing System for Real-Time Holographic Video Computation", Reconfigurable Technology: FPGAs for Computing and Application, Proceedings for the SPIE, Sep. 1999, Boston, pp. 129-140, vol. 3844.

"RFC793: Transmission Control Protocol, Darpa Internet Program, Protocol Specification", Sep. 1981.

Anerousis et al., "Using the AT&T Labs PacketScope for Internet Measurement, Design, and Performance Analysis", Network and Distributed Systems Research Laboratory, AT&T Labs-Research, Florham, Park, NJ, Oct. 1997.

Artan et al., "Multi-packet Signature Detection using Prefix Bloom Filters", 2005, IEEE, pp. 1811-1816.

Baboescu et al., "Scalable Packet Classification", Published 2001.

Bloom, "Space/Time Trade-offs in Hash Coding With Allowable Errors", Communications of the ACM, Jul. 1970, pp. 422-426, vol. 13, No. 7, Computer Usage Company, Newton Upper Falls, Massachusetts, USA.

Chaney et al., "Design of a Gigabit ATM Switch", Washington University, St. Louis, Published 1997.

Cuppu and Jacob, "Organizational Design Trade-Offs at the DRAM, Memory Bus and Memory Controller Level: Initial Results," Technical Report UMB-SCA-1992-2, Univ. of Maryland Systems & Computer Architecture Group, Nov. 1999, pp. 1-10.

Dharmapurikar et al., "Deep Packet Inspection Using Parallel Bloom Filters," Symposium on High Performance Interconnects (Hotl), Stanford, California, 2003, pp. 44-51.

Dharmapurikar et al., "Longest Prefix Matching Using Bloom Filters," SIGCOMM, 2003, pp. 201-212.

Dharmapurikar et al., "Robust TCP Stream Reassembly in the Presence of Adversaries", Proc. of the 14th Conference on USENIX Security Symposium—vol. 14, 16 pages, Baltimore, MD, 2005; http://www.icir.org/vern/papers/TcpReassembly/TCPReassembly.pdf.

Feldmann, "BLT: Bi-Layer Tracing of HTTP and TCP/IP", AT&T Labs-Research, Florham Park, NJ, USA, Published 2000.

Gupta et al., "Packet Classification on Multiple Fields", Computer Systems Laboratory, Stanford University, Stanford, CA, Published Oct. 1999.

Gurtov, "Effect of Delays on TCP Performance", Cellular Systems Development, Sonera Corporation, Published 2001.

International Search Report for PCT/US2002/033286; Jan. 22, 2003.

International Search Report for PCT/US2005/030046; Sep. 25, 2006.

Jacobson et al., "RFC 1072: TCP Extensions for Long-Delay Paths", Oct. 1988.

Jacobson et al., "tcpdump—dump traffic on a network", Published Jun. 1997.

Johnson et al., "Pattern Matching in Reconfigurable Logic for Packet Classification", College of Computing, Georgia Institute of Technology, Atlanta, GA, Published Nov. 2001.

Madhusudan, "Design of a System for Real-Time Worm Detection", Hot Interconnects, pp. 77-83, Stanford, CA, Aug. 2004, found at http://www.hoti.org/hoti12/program/papers/2004/paper4.2.pdf.

Madhusudan, "Design of a System for Real-Time Worm Detection", Master's Thesis, Washington Univ., Dept. of Computer Science and Engineering, St. Louis, MO, Aug. 2004.

Madhusudan, "Design of a System for Real-Time Worm Detection", Power Point Presentation in Support of Master's Thesis, Washington Univ., Dept. of Computer Science and Engineering, St. Louis, MO, Aug. 2004.

Mao et al., "Cluster-based Online Monitoring System of Web Traffic", Dept. of Computer Science and Technology, Tsinghua Univ., Bejing, 100084 P.R. China, Published 2001.

Moscola et al., "FPSed: A Streaming Content Search-And-Replace Module for an Internet Firewall", Proc. of Hot Interconnects, 11th Symposium on High Performance Interconnects, pp. 122-129, Aug. 20, 2003.

Necker et al., "TCP-Stream Reassembly and State Tracking in Hardware", School of Electrical and Computer Engineering, Georgia Institute of Technology, Atlanta, GA, Published 2002.

Prakash et al., "OC-3072 Packet Classification Using BDDs and Pipelined SRAMs", Department of Electrical and Computer Engineering, The University of Texas at Austin, Published 2001.

Roberts, "Internet Still Growing Dramatically Says Internet Founder", Press Release, Caspian Networks, Inc.—Virtual Pressroom, Published Aug. 2001.

Schuehler et al., "Architecture for a Hardware Based, TCP/IP Content Scanning System", IEEE Micro, 24(1):62-69, Jan.-Feb. 2004, USA.

Schuehler et al., "TCP-Splitter: A TCP/IP Flow Monitor in Reconfigurable Hardware", Hot Interconnects 10 (Hotl-10), Stanford, CA, Aug. 21-23, 2002, pp. 127-131.

Shalunov et al., "Bulk TCP Use and Performance on Internet 2", Published 2001.

Singh et al., "The EarlyBird System for Real-Time Detection on Unknown Worms", Technical report CS2003-0761, Aug. 2003.

Taylor et al., "Dynamic Hardware Plugins (DHP): Exploiting Reconfigurable Hardware for High-Performance Programmable Routers", Computer Networks, 38(3): 295-310 (16), Feb. 21, 2002, and online at http://www.cc.gatech.edu/classes/AY2007/cs8803hpc_fall/papers/phplugins.pdf.

Waldvogel et al., "Scalable High-Speed Prefix Matching", Published Nov. 2001.

Weaver et al., "Very Fast Containment of Scanning Worms", Proc. USENIX Security Symposium 2004, San Diego, CA, Aug. 2004, located at http://www.icsi.berkely.edy/~nweaver/containment/containment.pdf.

Wooster et al., "HTTPDUMP Network HTTP Packet Snooper", Apr. 25, 1996.

Yan et al., "Enhancing Collaborative Spam Detection with Bloom Filters", 2006, IEEE, pp. 414-425.

Amanuma et al., "A FPGA Architecture For High Speed Computation", Proceedings of 60th Convention Architecture, Software Science, Engineering, Mar. 14, 2000, pp. 1-163-1-164, Information Processing Society, Japan.

Asami et al., "Improvement of DES Key Search on FPGA-Based Parallel Machine "RASH"", Proceedings of Information Processing Society, Aug. 15, 2000, pp. 50-57, vol. 41, No. SIG5 (HPS1), Japan.

Dharmapurikar et al., "Design and Implementation of a String Matching System for Network Intrusion Detection using FPGA-based Bloom Filters", Proc. of 12th Annual IEEE Symposium on Field Programmable Custom Computing Machines, 2004, pp. 1-10.

International Preliminary Report on Patentability (Chapter II) for PCT/US2007/060835 issued Apr. 20, 2010.

Koloniari et al., "Content-Based Routing of Path Queries in Peer-to-Peer Systems", pp. 1-19, E. Bertino et al. (Eds.): EDBT 2004, LNCS 2992, pp. 29-47, 2004, copyright by Springer-Verlag, Germany.

Li et al., "Large-Scale IP Traceback in High-Speed Internet: Practical Techniques and Theoretical Foundation", Proceedings of the 2004 IEEE Symposium on Security and Privacy, 2004, pp. 1-15.

Seki et al., "High Speed Computation of Shogi With FPGA", Proceedings of 58th Conventino Architecture, Software Science, Engineering, Mar. 9, 1999, pp. 1-133-1-134.

Yoshitani et al., "Performance Evaluation of Parallel Volume Rendering Machine Re Volver/C40", Study Report of Information Processing Society, Mar. 5, 1999, pp. 79-84, vol. 99, No. 21.

Notice of Allowance for U.S. Appl. No. 11/765,306 dated Jan. 25, 2011.

Notice of Allowance for U.S. Appl. No. 11/932,391 dated Jan. 19, 2011.

Notice of Allowance for U.S. Appl. No. 11/932,652 dated Jan. 19, 2011.

* cited by examiner

FIRMWARE SOCKET MODULE FOR FPGA-BASED PIPELINE PROCESSING

THE NAMES OF PARTIES TO A JOINT RESEARCH AGREEMENT

Washington University, a corporation of the State of Missouri, and Data Search Systems, Inc., a corporation of the State of Delaware (now Exegy Incorporated, a corporation of the State of Delaware), are parties to a Joint Research Agreement.

FIELD OF THE INVENTION

The present invention is directed toward the field of interfacing hardware with software to support high speed data processing operations in hardware.

BACKGROUND AND SUMMARY OF THE INVENTION

The ability to improve a computing system's data throughput capabilities when processing large volumes of data is an ever present challenge. In many instances, processing large data volumes using software executed by a general-purpose processor will be too slow to meet the needs of users. Therefore, it is desirable to either relocate data processing functionality away from software executed by the general-purpose processor of a computer and into firmware deployed on hardware or to partition data processing functionality between such firmware and software. However, when doing so, hardware devices (such as reconfigurable logic devices) need to be interconnected with external resources such as data storage and the software executed by the computer's general-purpose processor in a manner that does not create a bottleneck as data and commands flow back and forth between the hardware and the software.

As used herein, the term "general-purpose processor" will refer to a hardware device that fetches instructions and executes those instructions (for example, an Intel Xeon processor or an AMD Opteron processor). The term "reconfigurable logic" will refer to any logic technology whose form and function can be significantly altered (i.e., reconfigured) in the field post-manufacture. This is to be contrasted with a general-purpose processor whose function can change post-manufacture, but whose form is fixed at manufacture. The term "software" will refer to data processing functionality that is deployed on a general-purpose processor. The term "firmware" will refer to data processing functionality that is deployed on reconfigurable logic.

In an effort to address the needs in the art, the inventors herein disclose a new design for a firmware socket module that interfaces at least one firmware application module deployed on a reconfigurable logic device with external memory and software. The firmware socket module is also preferably deployed on the reconfigurable logic device. The at least one firmware application module is configured to perform a data processing operation on any target data that it receives, wherein the data processing operation that the at least one firmware application module performs is controlled by a software-based command. Preferably, the at least one firmware application module comprises a plurality of firmware application modules that are arranged in a pipeline. Each firmware application module in the pipeline is preferably individually addressable for command information. Thus, commands can be issued to specific firmware application modules in the pipeline to control the data processing operations of those specific firmware application modules.

The firmware socket module is configured to access external memory and software to receive the commands and target data that are to be processed through the firmware application module pipeline. Preferably, the firmware socket module issues transactions to a system bus to perform direct memory access (DMA) transfers of commands and target data from the computer system's memory to itself. The firmware socket module is configured to in turn provide these commands and target data to the first one of the firmware application modules in the pipeline in a predetermined order that is defined by software.

The firmware socket module and firmware application module pipeline are preferably configured to strictly maintain the predetermined order of inbound commands and target data when propagating commands and target data through the system. When target data reaches a firmware application module in the pipeline, the firmware application module performs its specified data processing operation on the target data and then provides the so-processed target data to the next firmware application module in the pipeline. When command data reaches a firmware application module in the pipeline, the firmware application module will check to see whether the command is directed toward it and, if it is, will interpret that command to re-arrange its data processing operation as appropriate. If the command is to be propagated further down the pipeline, then the firmware application module will pass the command to the next firmware application module in the pipeline.

The flow of commands and target data, either into the firmware socket module or into the entry point of the firmware application module pipeline, can be thought of as a single stream in which both commands and target data are interleaved in accordance with the defined order. When it is said that the commands and data are interleaved, this does not require (although it does not exclude) a stream of command/data/command/data/command/data . . . . Instead, the interleaved stream of commands and data described herein encompasses a stream such as command/command/command/data/data/data/data/data/command . . . wherein the order of commands and data in the stream is defined by software and preserved by the firmware socket module when it propagates the stream to the firmware application module pipeline.

Appropriate commands that control the firmware application module's data processing operation should precede that target data in the stream of commands and target data entering the firmware application pipeline, thereby allowing the data processing operations of the firmware application modules to be appropriately controlled prior to processing target data. To facilitate the ease by which this strict ordering of commands and target data is maintained, the firmware socket module is configured to provide both command and target data to the first firmware application module in the pipeline over the same communication path that links the firmware socket module with the first firmware application module of the pipeline.

The natural synchronization between commands and target data provided by this firmware socket module-to-firmware application module pipeline connection avoids complexity in the system and also enhances data throughput. In prior art socket interfaces known to the inventors herein, commands are communicated to data processing modules via a different communication path than the communication path used to communicate target data to data processing modules. When such data processing modules are pipelined, such dual communication paths create management difficulties when attempting to synchronize commands with data. In such cases, when new commands are issued to a data processing module in the pipeline, the entire pipeline will typically need to be flushed of previous commands and previous data before that command and any further target data can be processed through the pipeline, thereby greatly detracting from the pipeline's throughput capabilities. By way of distinction, however, with the present invention one firmware application module of the pipeline can take action on a command while other firmware application modules in the pipeline are simultaneously processing data in accordance with their defined data processing operations. Thus, commands can be issued to firmware application modules to adjust their data processing operations without requiring the entire pipeline to be flushed out.

High level software that is executed by the computer system's general-purpose processor preferably defines the order of commands and data that are eventually propagated through the firmware socket module and the firmware application module pipeline. Lower level device driver software that is also executed by the computer system's general-purpose processor then preferably preserves this defined order of commands and data and makes such ordered commands and data available to the firmware socket module. The device driver software preferably preserves this order by managing an input descriptor pool buffer in which pointers to commands and target data are stored. The firmware socket module will access the input descriptor pool buffer to learn of the commands and target data that are to be delivered to the firmware application module pipeline.

On the outbound side of the firmware socket module (outbound to software), the device driver software preferably maintains separate buffers for output commands and outbound data to notify the firmware socket module of where commands and data that have been processed by the firmware application module should be stored in memory for subsequent access by computer system software.

Among the advantages that the preferred embodiment of the invention provides are the ability to reliably deliver flow-controlled data from software to a reconfigurable logic device and vice versa, and the ability to develop firmware application modules independent of the computer system in which they are deployed (so long as the firmware application modules conform to the signaling requirements of the firmware socket module). These and other features of the present invention will be in part pointed out and in part apparent to those having ordinary skill in the art upon review of the following description and figures.

DETAILED DESCRIPTION OF THE PREFERRED EMBODIMENT

Figure 1:
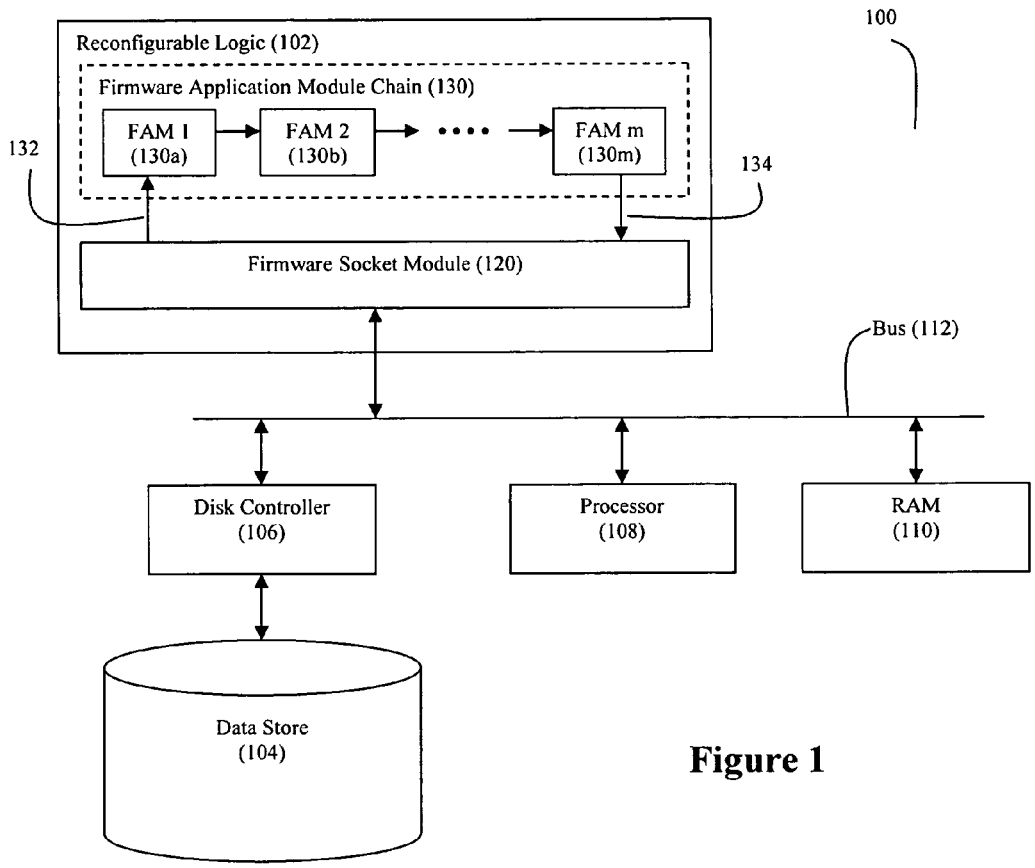
FIG. 1 is a block diagram view of a preferred system that embodies the present invention.

FIG. 1 depicts a preferred system 100 in accordance with the present invention. In this system, a reconfigurable logic device 102 is positioned to receive data that streams off the disk subsystem defined by disk controller 106 and data store 104 (either directly or indirectly by way of system memory such as RAM 110). Preferably, this data streams into the reconfigurable logic device by way of system bus 112, although other design architectures are possible (see FIG. 3(b)). Preferably, the reconfigurable logic device is a field programmable gate array (FPGA), although this need not be the case. System bus 112 also interconnects the reconfigurable logic device 102 with the computer system's main processor 108 as well as the computer system's RAM 110. The term "bus" as used herein refers to a logical bus which encompasses any physical interconnect for which devices and locations are accessed by an address. Examples of buses that could be used in the practice of the present invention include, but are not limited to the PCI family of buses (e.g., PCI-X and PCI-Express) and HyperTransport buses. In a preferred embodiment, system bus 112 may be a PCI-X bus, although this need not be the case.

The data store can be any data storage device/system, but is preferably some form of a mass storage medium. For example, the data store 104 can be a magnetic storage device such as an array of Seagate disks. However, it should be noted that other types of storage media are suitable for use in the practice of the invention. For example, the data store could also be one or more remote data storage devices that are accessed over a network such as the Internet or some local area network (LAN).

The computer system defined by main processor 108 and RAM 110 is preferably any commodity computer system as would be understood by those having ordinary skill in the art. For example, the computer system may be an Intel Xeon system or an AMD Opteron system.

The reconfigurable logic device 102 has firmware modules deployed thereon that define its functionality. The firmware socket module 120 handles the data movement requirements (both command data and target data) into and out of the reconfigurable logic device, thereby providing a consistent application interface to the firmware application module (FAM) chain 130 that is also deployed on the reconfigurable logic device. The FAMs 130i of the FAM chain 130 are configured to perform specified data processing operations on any target data that streams through the chain 130 from the firmware socket module 120. Preferred examples of FAMs that can be deployed on reconfigurable logic are described in U.S. Pat. No. 6,711,558 (entitled "Associative Database Scanning and Information Retrieval"), pending U.S. patent application Ser. No. 10/153,151 (filed May 21, 2002 entitled "Associative Database Scanning and Information Retrieval using FPGA Devices" and published as 2003/0018630), published PCT applications WO 05/048134 and WO 05/026925 (both filed May 21, 2004 and entitled "Intelligent Data Storage and Processing Using FPGA Devices"), U.S. provisional patent application No. 60/658,418 (filed Mar. 3, 2005 and entitled "Biosequence Similarity Searching Using FPGA Devices"), U.S. provisional patent application No. 60/736,081 (filed Nov. 11, 2005 and entitled "Method and Apparatus for Performing Biosequence Similarity Searching") and U.S. patent application Ser. No. 11/293,619 (filed Dec. 2, 2005 and entitled "Method and Device for High Performance Regular Expression Pattern Matching"), the entire disclosures of each of which are incorporated herein by reference. For example, a non-exhaustive list of exemplary data processing operations that can be performed by FAMs include data search operations (of various types), data encryption operations (using any of a number of encryption techniques and/or encryption keys), data decryption operations (using any of a number of decryption techniques and/or decryption keys), data compression operations (using any of a number of data compression techniques), data decompression operations (using any of a number of data decompression techniques), and data reduction operations.

The specific data processing operation that is performed by a FAM is controlled/parameterized by the command data that FAM receives from the firmware socket module 120. This command data can be FAM-specific, and upon receipt of the command, the FAM will arrange itself to carry out the data processing operation controlled by the received command.

Once a FAM has been arranged to perform the data processing operation specified by a received command, that FAM is ready to carry out its specified data processing operation on the target data that it receives from the firmware socket module. Thus, a FAM can be arranged through an appropriate command to search a specified stream of target data for the presence of the term "Smith" therein. Once the FAM has performed the search operation on the target data stream for the term "Smith", another command can be sent to that FAM that will cause the FAM to re-arrange itself to search for the term "Jones". Not only will the FAM operate at hardware speeds (thereby providing a high throughput of target data through the FAM), but the FAMs can also be flexibly reprogrammed to change the parameters of their data processing operations.

The FAM chain 130 preferably comprises a plurality of firmware application modules (FAMS) 130a, 130b, . . . that are arranged in a pipelined sequence. As used herein, "pipeline", "pipelined sequence", or "chain" refers to an arrangement of FAMs wherein the output of one FAM is connected to the input of the next FAM in the sequence. This pipelining arrangement allows each FAM to independently operate on any data it receives during a given clock cycle and then pass its output to the next downstream FAM in the sequence during another clock cycle.

A communication path 132 connects the firmware socket module 120 with the input of the first one of the pipelined FAMs 130a. The input of the first FAM 130a serves as the entry point into the FAM chain 130. A communication path 134 connects the output of the final one of the pipelined FAMs 130m with the firmware socket module 120. The output of the final FAM 130m serves as the exit point from the FAM chain 130. Both communication path 132 and communication path 134 are preferably multi-bit paths.

Figure 2:
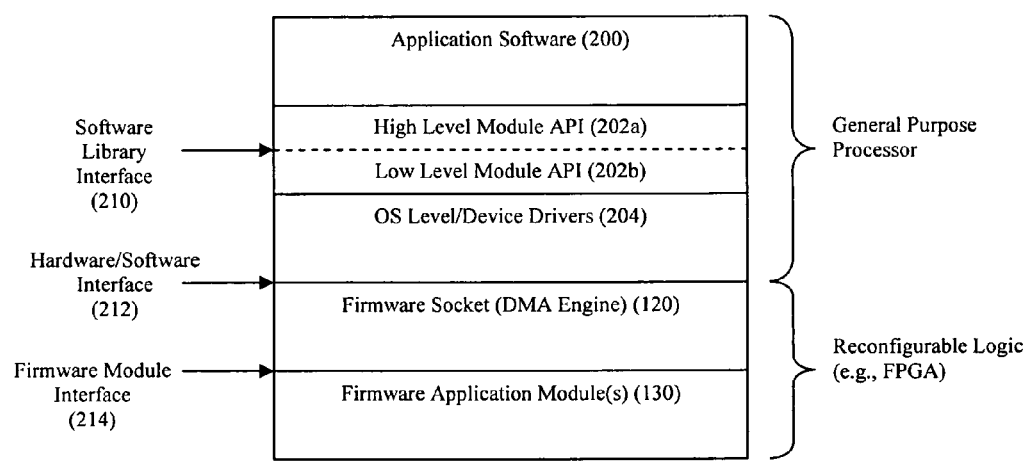
FIG. 2 illustrates an exemplary framework for the deployment of software and firmware for the preferred system.

FIG. 2 depicts an exemplary framework for the deployment of applications on the system 100 of FIG. 1. The top three layers of FIG. 2 represent functionality that is executed in software on the computer system's general-purpose processor 108. The bottom two layers represent functionality that is executed in firmware on the reconfigurable logic device 102.

The application software layer 200 corresponds to high level functionality such as the type of functionality wherein one or more users interact with the application to define which data processing operations are to be performed by the FAMs and to define what target data those data processing operations are to be performed upon.

The next layer is the module application programming interface (API) layer 202 which comprises a high level module API 202a and a low level module API 202b. The high level module API 202a can provide generic services to application level software (for example, managing callbacks). The low level module API 202b manages the operation of the operating system (OS) level/device driver software 204. A software library interface 210 interfaces the high level module API 202a with the low level module API 202b. Details about this software library interface are provided below.

The interface between the device driver software 204 and the firmware socket module 120 serves as the hardware/software interface 212 for the system 100. The details of this interface 212 will be described in greater detail in connection with FIG. 5.

The interface between the firmware socket module 120 and the FAM chain 130 is the firmware module interface 214. The details of this interface will be described in greater detail in connection with FIG. 4.

Figure 3A:
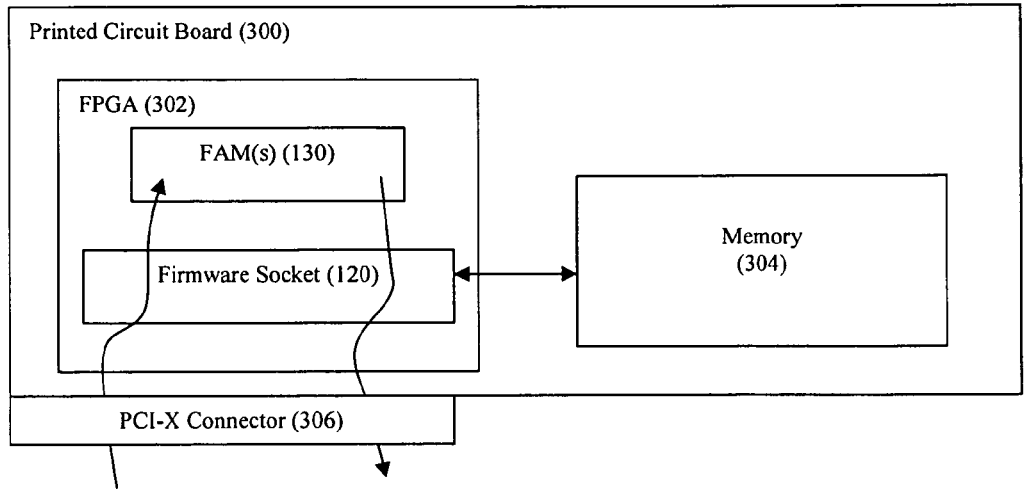
FIG. 3(a) is a block diagram view of a preferred printed circuit board for installation into a computer system to carry out data processing tasks in accordance with the present invention.
Figure 3B:
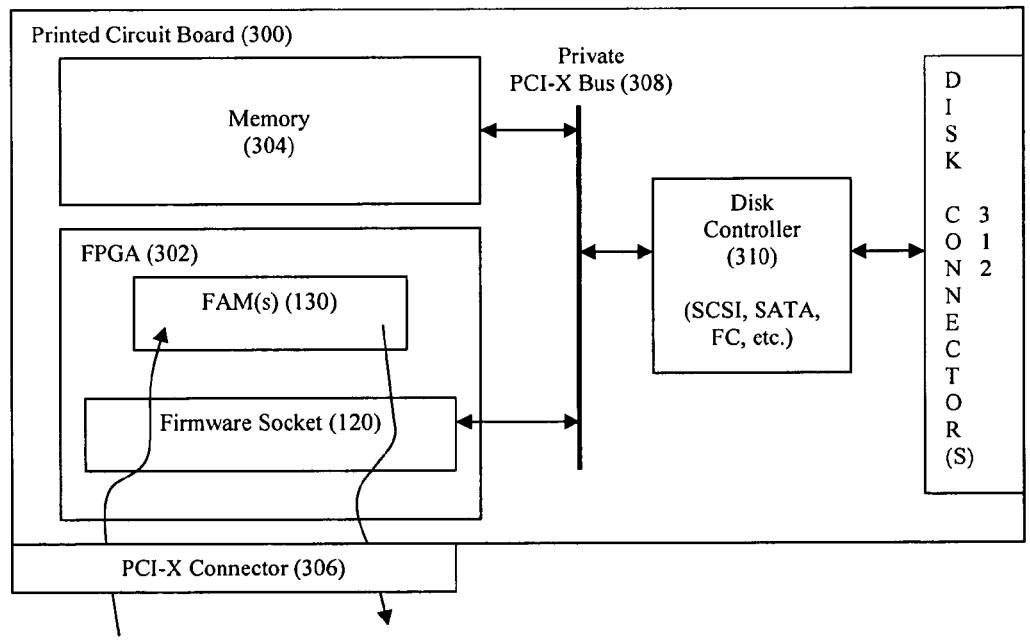
FIG. 3(b) is a block diagram view of an alternate printed circuit board for installation into a computer system to carry out data processing tasks in accordance with the present invention.

FIG. 3(*a*) depicts a printed circuit board or card 300 that can be connected to the PCI-X bus 112 of a commodity computer system. In the example of FIG. 3(*a*), the printed circuit board includes an FPGA 302 (such as a Xilinx Virtex II FPGA) that is in communication with a memory device 304 and a PCI-X bus connector 306. A preferred memory device 304 comprises SRAM and DRAM memory. A preferred PCI-X bus connector 306 is a standard card edge connector.

FIG. 3(*b*) depicts an alternate configuration for a printed circuit board/card 300. In the example of FIG. 3(*b*), a private bus 308 (such as a PCI-X bus), a disk controller 310, and a disk connector 312 are also installed on the printed circuit board 300. Any commodity disk technology can be supported, including but not limited to SCSI, SATA, Fibre Channel (FC), etc. In this configuration, the firmware socket 120 also serves as a PCI-X to PCI-X bridge to provide the processor 108 with normal access to the disk(s) connected via the private PCI-X bus 308.

Figure 8:
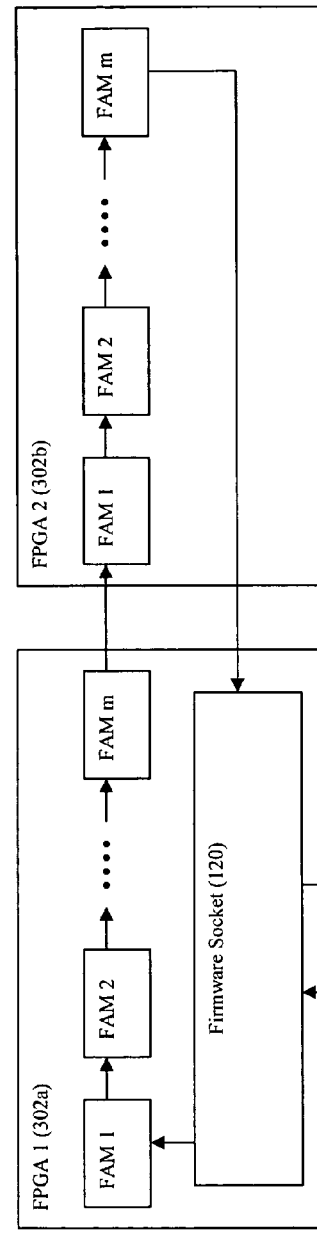
FIG. 8 illustrates an example of how the firmware application modules of a pipeline can be deployed across multiple FPGAs.

It is worth noting that in either the configuration of FIG. 3(*a*) or 3(*b*), the firmware socket 120 can make memory 304 accessible to the PCI-X bus, which thereby makes memory 304 available for use by the OS kernel 204 as the buffers for transfers from the disk controller to the FAMs. It is also worth noting that while a single FPGA 302 is shown on the printed circuit boards of FIGS. 3(*a*) and (*b*), it should be understood that multiple FPGAs can be supported by either including more than one FPGA on the printed circuit board 300 or by installing more than one printed circuit board 300 in the computer system. FIG. 8 depicts an example where numerous FAMs in a single pipeline are deployed across multiple FPGAs.

As shown in FIGS. 1-3, inbound data (from the kernel 204 to the card 300) is moved across the bus 112 in the computer system to the firmware socket module 120 and then delivered by the firmware socket module 120 to the FAM chain 130. Outbound data (from the card 300 to the kernel 204) are delivered from the FAM chain 130 to the firmware socket module 120 and then delivered by the firmware socket module 120 across the PCI-X bus to the software application executing on the computer system. As shown in FIG. 2, the three interacting interfaces that are used are the firmware module interface 214, the hardware/software interface 212, and the software library interface 210.

Firmware Module Interface 214—Signal Layer

Figure 4:
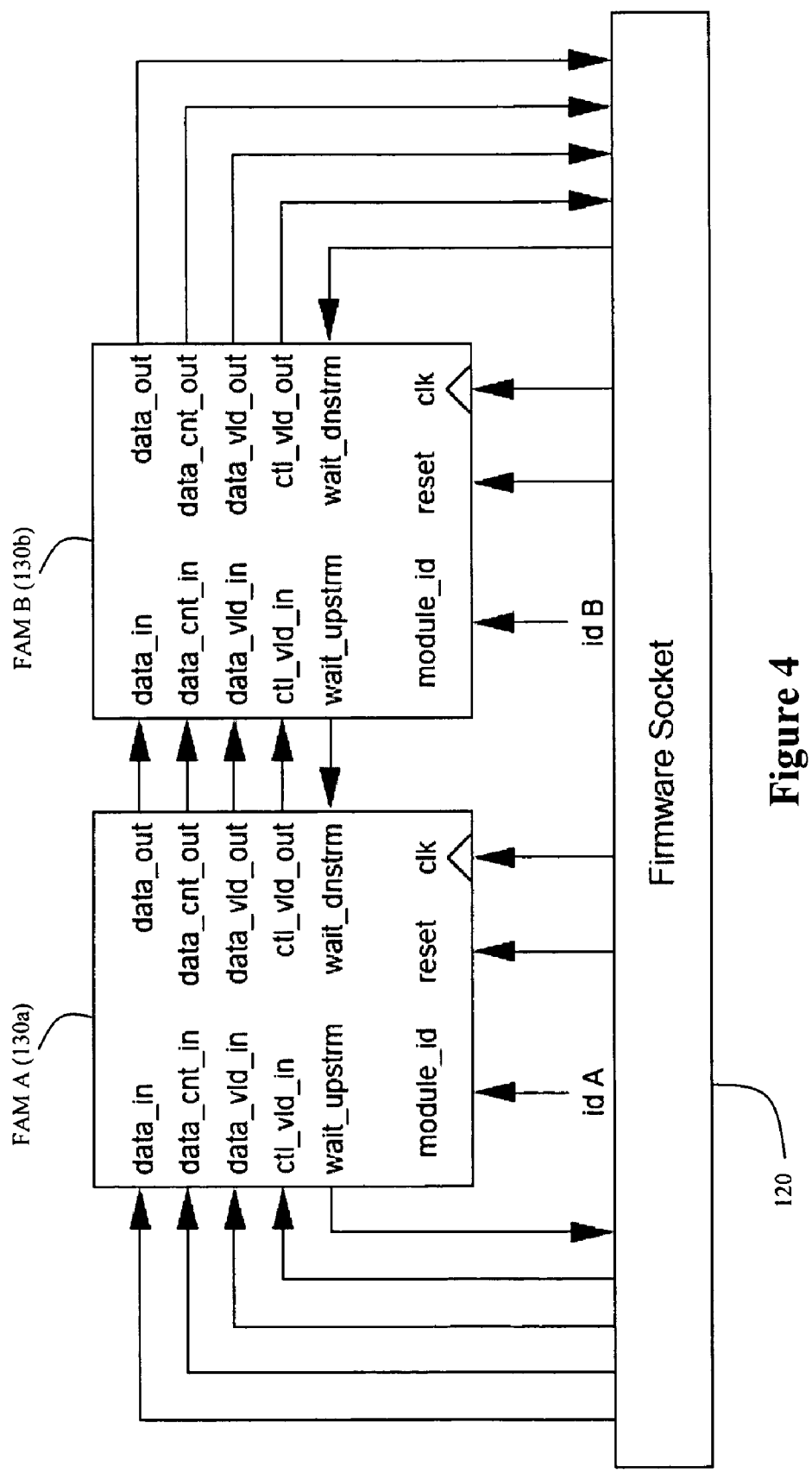
FIG. 4 depicts the preferred signal layer interface between the firmware socket module and the firmware application modules.

The firmware module interface 214, which is shown in FIG. 4, includes the signals exchanged between the firmware socket module 120 and the signals exchanged between FAMs within the FAM chain 130. Table 1 and the description below further describe these signals.

TABLE 1

| Signal Name | Description | Signal Direction | Signal Size |
|---|---|---|---|
| clk | Clock | Input | Signal |
| reset | Reset | Input | Signal |
| module_id | Module ID | Input | 6-bit bus |
| data_in | Input Data | Input | 64-bit bus |
| data_cnt_in | Data Count | Input | 3-bit bus |
| data_vld_in | Data Valid | Input | Signal |
| ctrl_vld_in | Control Valid | Input | Signal |
| wait_upstream | Wait Upstream | Output | Signal |
| data_out | Output Data | Output | 64-bit bus |
| data_cnt_out | Data Count | Output | 3-bit bus |
| data_vld_out | Data Valid | Output | Signal |
| ctrl_vld_out | Control Valid | Output | Signal |
| wait_dnstrm | Wait Downstream | Input | Signal |

The signal direction entries in the table are listed from the perspective of a firmware module. Thus, signals (4) through (8) ("data_in", "data_cnt_in", "data_vld_in", "ctrl_vld_in", and "wait_upstrm") comprise the interface signals with an upstream firmware module (e.g., communication path 132). Signals (9) through (13) ("data_out", "data_cnt_out", "data_vld_out", "ctrl_vld_out", and "wait_dnstrm") comprise the interface signals with a downstream firmware module (e.g., communication path 134).

The signal "clk" is a 1-bit input signal that is used to clock the firmware socket module and FAM chain.

The signal "reset" is a 1-bit input signal that is used to reset the firmware socket module and the FAM chain to its start-up state.

The signal "module_ID" is a 6-bit input bus that informs each firmware module of its position in the FAM chain.

The signal "data_in" is a 64-bit bus that is used to transfer target data and command data into the FAM chain. Of note, by using the same bus to transfer both data and commands, synchronization between commands and target data can be maintained with little complexity.

The signal "data_cnt_in" is a 3-bit bus that is used to determine how many of the 8 bytes on the input bus "data_in" represent meaningful data. Preferably, values of 1-7 are literally interpreted, and a value of 0 means that all 8 bytes are valid.

The signal "data_vld_in" is a 1-bit input signal that is used to indicate that the data on the "data_in" bus and the "data_cnt_in" bus are valid on a given clock cycle.

The signal "ctrl_vld_in" is a 1-bit input signal that is used to indicate that the data on the "data_in" bus is valid command (control) information on a given clock cycle. It is worth noting that the "ctrl_vld_in" and "data_vld_in" signals into the same FAM should not be asserted at the same time.

The signal "wait_upstrm" is a 1-bit output signal that is used to tell the upstream firmware module to stop pushing data into the current firmware module. Preferably, the firmware module is configured to absorb 2 data values after the wait is asserted.

The signal "data_out" is a 64-bit output bus that is used to transfer both data and commands out of a given FAM. Once again, because the same bus is used to transfer both data and commands, synchronization between commands and target data can be maintained through the FAM chain as each FAM operates on the received commands and target data.

The signal "data_cnt_out" is a 3-bit bus that is used to determine how many of the 8 bytes on the output bus "data_out" represent meaningful data. Preferably, values of 1-7 are literally interpreted, and a value of 0 means that all 8 bytes are valid.

The signal "data_vld_out" is a 1-bit output signal that is used to indicate that the data on the "data_out" bus and the "data_cnt_out" bus are valid on a given clock cycle.

The signal "ctrl_vld_out" is a 1-bit output signal that is used to indicate that the data on the "data_out" bus is valid command (control) information on a given clock cycle. It is worth noting that the "ctrl_vld_out" and "data_vld_out" signals out of the same FAM should not be asserted at the same time.

The signal "wait_dnstrm" is a 1-bit input signal that is used to indicate to the FAM that either the firmware socket module or a downstream module cannot absorb data at the moment. Preferably, no more data should be shipped out from that FAM until "wait_dnstrm" is deasserted.

It is worth noting that some contiguous FAMs in the FAM chain may form a FAM subset, the FAM subset having its own entry point and exit point. In such instances, the signal interface described in the table above would be maintained with respect to the entry point and the exit point of the FAM subset, but a different signaling interface can optionally be used internally between the FAMs of the FAM subset. It is also worth noting that a FAM itself may be comprised of a chain of firmware application submodules, wherein communications between the submodules may optionally follow a different signaling interface than that described in the above table.

Firmware Module Interface 214—Logical Layer

As noted, the information delivered across the firmware module interface on the 64-bit "data_in" and "data_out" buses can either be application data or command (control) information. Both the firmware socket module 120 and the individual FAMs 130i maintain the ordering of commands and data, so this order is preserved throughout the chain of FAMs. Information flowing down the chain along the "data_in" and "data_out" buses (from the firmware socket module to the first FAM in the chain, from one FAM to the next downstream FAM, and from the final FAM in the chain to the firmware socket module) that is data is referred to as the data channel. Information flowing down the chain along the "data_in" and "data_out" buses that is command (control) information is referred to as the command channel. Commands that are delivered via the command channel are typically not consumed, but are interpreted (if appropriate) and passed on to downstream modules. As a result, many commands that enter the command channel are also delivered back to the software.

On the command channel, a preferred format for individual commands is for them to have a 64 bit length with the following fields:
command (16 bits); error (1 bit); sync (1 bit); reserved (8 bits); module ID (6 bits); and parameters (32 bits).

The command field is preferably encoded as two ASCII characters (e.g., "QY" can be a query command), but this need not be the case—any 16 bit value is valid. Upon entry into the command channel, the error bit is clear. Any module can thereafter set the error bit if appropriate, which is then communicated back to the software when the command exits the FAM chain and firmware socket module. The sync bit is preferably set to control synchronization of the outbound commands and data on their way back to the software.

The module ID field identifies the specific firmware module that is to respond to the command. Preferably, a value of 0 for the module ID means that all modules are to respond to the command (including not only all of the FAMs but also the firmware socket module). Also, it is preferred that a value of 1 for the module ID means that all modules except the firmware socket module are to respond to the command. Preferably, the module ID value of 2 is reserved for the firmware socket module alone, and module ID values greater than or equal to 3 are directed toward specific FAMs. Each FAM will know of its own module ID value by virtue of the input signal module_ID described in connection with the firmware module interface's signal layer.

Preferred global commands for the firmware module interface include a reset command, query command, query response command, pass through command, start of data command, and end of data command.

The reset command (RS) operates to reset the entire FAM chain or individual FAMs, as indicated by the command's module ID field. Preferably, the parameter field is unused for this command.

The query command (QY) operates to query a module to assess its current status. The module should respond with one or more Query Response (QR) commands. After the module has responded with its query responses, that module passes the original QY command to the next module in the chain. Preferably, the parameter field is unused for this command.

One or more query response commands (QR) are generated by a module when it receives a QY command. Upon receipt of a query response, FAMs should simply forward them downstream. Preferably, the parameter field for a QR command is module-specific, wherein this 32-bit field is split into two subfields—the most significant 8 bits being a tag that indicates what type of information is being sent and the least significant 24 bits being the data associated with the given tag.

The pass through command (PS) informs a module if it is to pass data through unaltered or if it is to perform its normal data processing operation. The pass through mode does not impact command processing or command forwarding—its impact is limited only to the data channel. Preferably, the least significant bit (bit 0) of the parameter field enables/disables the pass through mode—with a pass through bit value of 1 enabling the pass through mode and a pass through bit value of 0 disabling the pass through mode.

The start of data command (SD) is used to mark the start of a data stream (typically on a file boundary). The end of data command (ED) is used to mark the end of a data stream (once again, typically on a file boundary). The parameter fields for the SD and ED command are preferably unused, although in some instances, they can be used to specify a file ID or a frame ID.

Command propagation through the FAM chain preferably proceeds as follows: (1) global commands (those commands whose module ID value is 0 or 1) are propagated forward by each FAM in the FAM chain, (2) a FAM will propagate forward any command whose module ID value is set for a different FAM, and (3) a FAM will propagate forward any command whose sync bit is set.

Preferred commands that are or can be specific to the firmware socket module include a data count command, reset command, and a query response command.

A data count command (DC) can be used to ask the firmware socket module how much data has passed through the FAM chain since the last time it was reset. One DC command sent to the firmware socket module will result in the 3 DC commands being returned. The first responsive DC command will identify the number of bytes that have gone into the FAM chain. The second responsive DC command will identify the number of bytes of data that has exited the FAM chain. The third responsive DC command will be the original sent DC command that is being returned. Preferably, an SD command or an RS command will operate to reset the data counts. With respect to the parameters field, the sent DC command's parameters field is preferably ignored while the parameters field of the responsive DC commands will preferably identify the relevant number of bytes as described above.

The reset command (RS) format is described above in connection with the global commands. When the firmware socket module receives an RS command, it preferably resets the entire FAM chain and also clears any input and output queues. Any data that may not yet have been returned from the card by the firmware socket module will be cleared by the RS command; thus, applications should make sure that they have received all expected data before sending a reset command to the firmware socket module. This can be achieved by sending a command with the sync bit set or by strobing the Flush bit in the firmware socket module's doorbell register.

The query response command (QR) format is also described above in connection with the global commands. Preferably, when the firmware socket module issues a QR command, its parameters field will be set as follows in Table 2 below:

TABLE 2

| Tag (8 bits) | Value (24 bits) |
| --- | --- |
| 0 | Module Type ("Firmware Socket Module") |
| 1 | Version Number |
| 2 | Build (Revision Number) |

Commands that are specific to the FAMs will vary as a function of each FAM's data processing operation. For example, a set of commands applicable to a FAM that is configured to perform a search operation where a pattern is matched to a stream of target data would preferably include commands that define the pattern(s) against which the data stream is searched, commands that identify how much context from the data stream should be returned when a match to the pattern is found in the data stream (e.g., returning X number of bytes before and after the match within the data stream), commands that define the number of mismatches allowed for a given pattern (e.g., if the pattern is of length 10, a mismatch value of K will allow a match to occur when any (10-K) of the 10 pattern characters match within the data stream), commands that define which bits in a pattern must find a match in the data stream for a match to be declared, commands that define a file within the data that is to be searched, and commands that define a subset of data within a file that should be searched. The parameters field or optionally other fields of such commands can be used to define these aspects of the pattern matching operation performed by the FAM. Also the QR command from a FAM that is configured to perform a pattern matching operation preferably responds with tags whose values correspond to an identification of the FAM type, an identification of the FAM type's version, an identification of the FAM type's build, and an identification of the number of patterns supported by the FAM.

As another example, a set of commands applicable to a FAM that is configured to perform an encryption or decryption operation would preferably include commands that identify the key that should be used in the encryption/decryption operation.

In addition to any other previously listed data processing operations that can be performed by FAMs, possible data processing operations also include a field selection operation that takes in fixed length records and passes only the bytes of the record that have been selected (wherein a command to such a FAM would indicate which bytes are to be selected), a record gate operation that adds padding to records whose size is not a multiple of the data size processed through the FAMs (8 bytes in the preferred example described herein) (wherein a command to such a FAM would indicate the desired record size), an inverse record gate operation that removes padding bytes from records (wherein a command to such a FAM would indicate which bytes of a record are to be removed), and a record select operation that searches within specified column boundaries of fixed length records for matches to one or more patterns (an operation whose commands would be similar to the pattern matching commands described above but also including a command that identifies how records are to be masked to limit the searches to occur within specified column boundaries).

Figure 7:
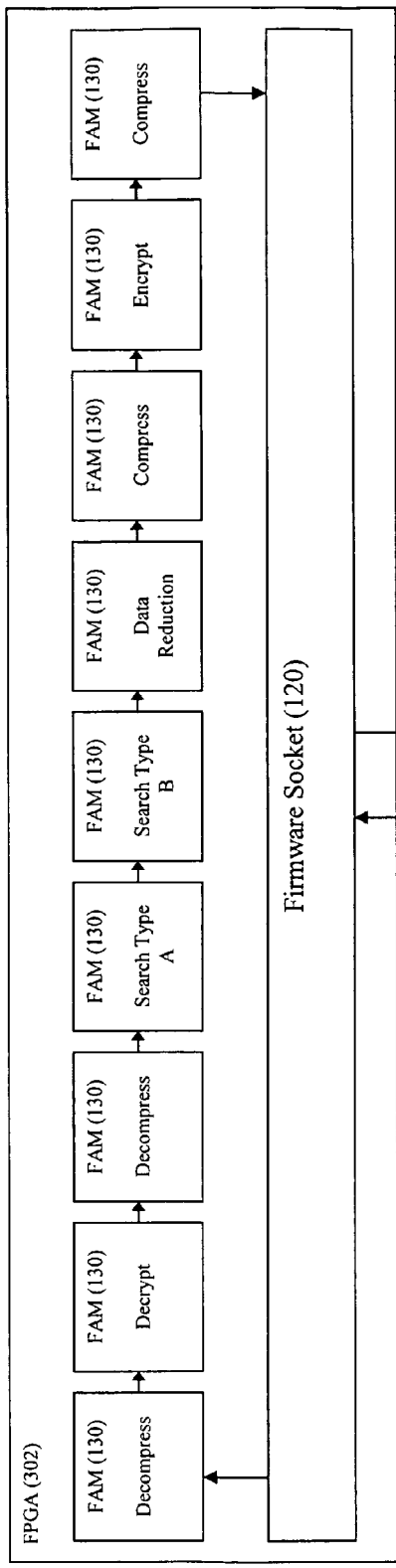
FIG. 7 illustrates an exemplary FPGA that has been configured with a firmware socket module and a plurality of pipelined firmware application modules, each of which is arranged to perform a different data processing operation.

Preferably, the FAMs that are deployed on the FPGA are dedicated to performing one type of data processing operation, wherein the command signals operate to define specific aspects of that type of data processing operation. For example, as shown in FIG. 7, each FAM in the FAM chain is devoted to a type of data processing operation—e.g., the first FAM is configured to performing a decompression operation, the $4^{th}$ FAM is configured to perform one type of search operation, the $5^{th}$ FAM is configured to perform another type of search operation, and the second to last FAM is configured to perform an encryption operation. Through appropriate commands, the specifics of each FAM's data processing operation can be controlled (e.g., to arrange the $4^{th}$ FAM to search for the term "Smith", or to arrange the second to last FAM to perform an encryption operation using Key A). If a FAM is to be entirely reprogrammed to perform a different type of data processing operation, it is preferred that the FPGA be reconfigured to achieve this end, although this need not be the case.

Furthermore, by appropriately turning on or off each FAM in the FAM chain, specialized processing operations can be achieved by the FAM chain. For example, to perform a search within a data stream for a given pattern wherein that data is stored in an encrypted format, commands can be sent to the FAM chain that (1) turns on one of the search FAMs and arranges it with the given pattern, (2) turns on the decryption FAM and arranges it with the appropriate key to decrypt the data stream, and (3) turns off all other FAMs in the chain. In such an instance, an encrypted data stream will be decrypted by the second FAM and the decrypted data stream will be searched by one of the search FAMs for the given pattern.

Hardware/Software Interface 212

Preferably, the firmware socket module uses a Xilinx PCI-X core with a backend to transfer data to/from the system's memory space when used in conjunction with driver level system software 204. The nature of this backend interface is described in greater detail herein.

The Xilinx PCI-X Core Version 5.0 handles translation from the interface as described by the PCI-X specification to an interface designed by Xilinx as described by the Xilinx LogiCore PCI-X Design Guide Version 5.0 and the Xilinx LogiCore PCI-X Implementation Guide Version 5.0. Preferably, the configuration parameters are set to indicate that the PCI-X-connected printed circuit board 300 is 64-bit and 133 MHz capable. Whether the system BIOS sets the speed of the device to 100 MHz or 133 MHz depends upon the 133 MHz capability bit and the physical voltage and time delay on the PCIXCAP pin. If the modules deployed on the FPGA 302 only run at 100 MHz, then the PCIXCAP pin should be set to indicate this. Also, the PCI-X configuration can be set to use up to 3 64-bit Base Address Registers (BARs) or 6 32-bit BARs. Preferably, the firmware socket module 120 uses the first BAR, configured as a 64-bit BAR, to map its device registers for communication with the device driver software 204.

Figure 5:
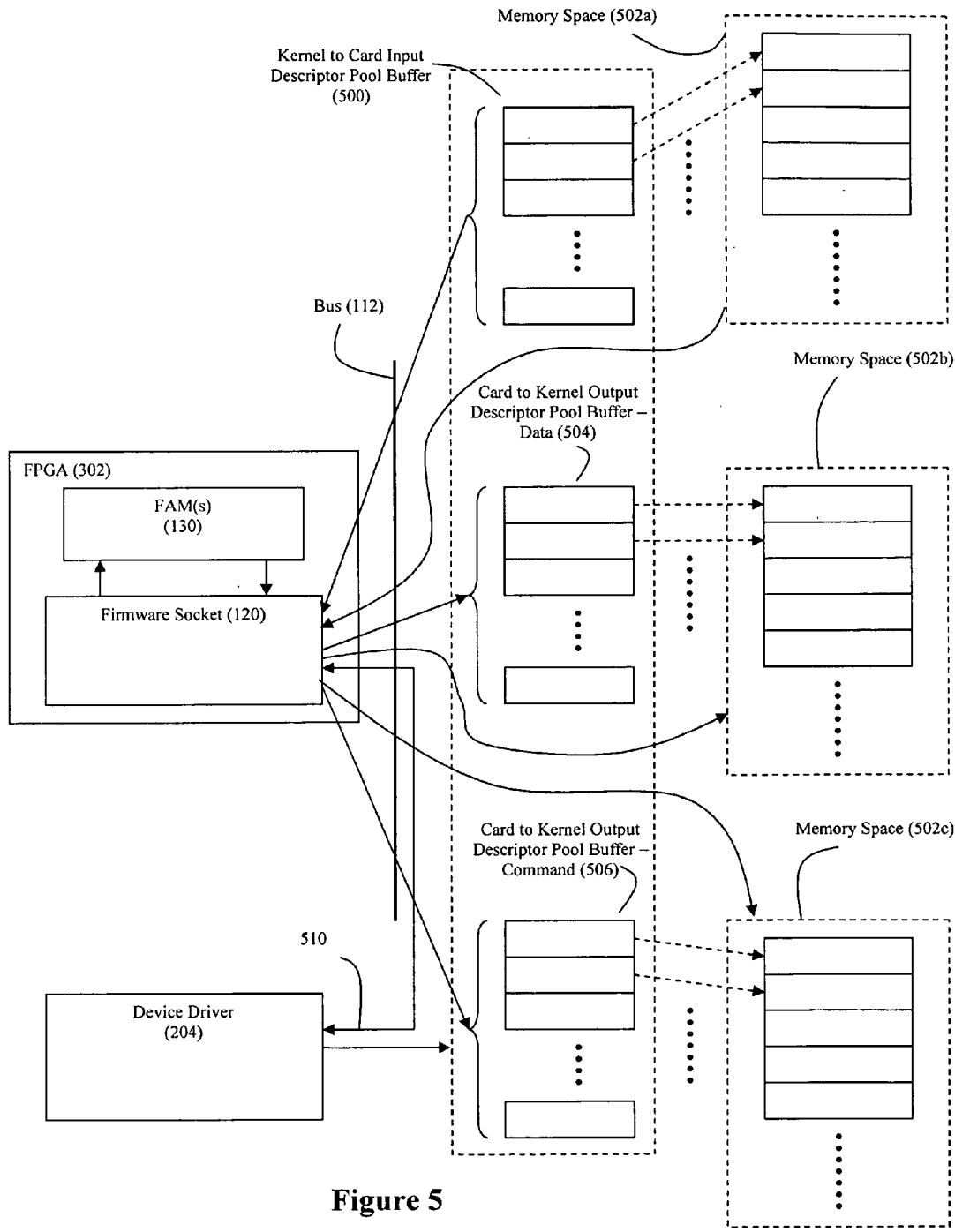
FIG. 5 depicts the preferred hardware/software interface between the firmware socket module and the memory space managed by the device driver.
Figure 6A:
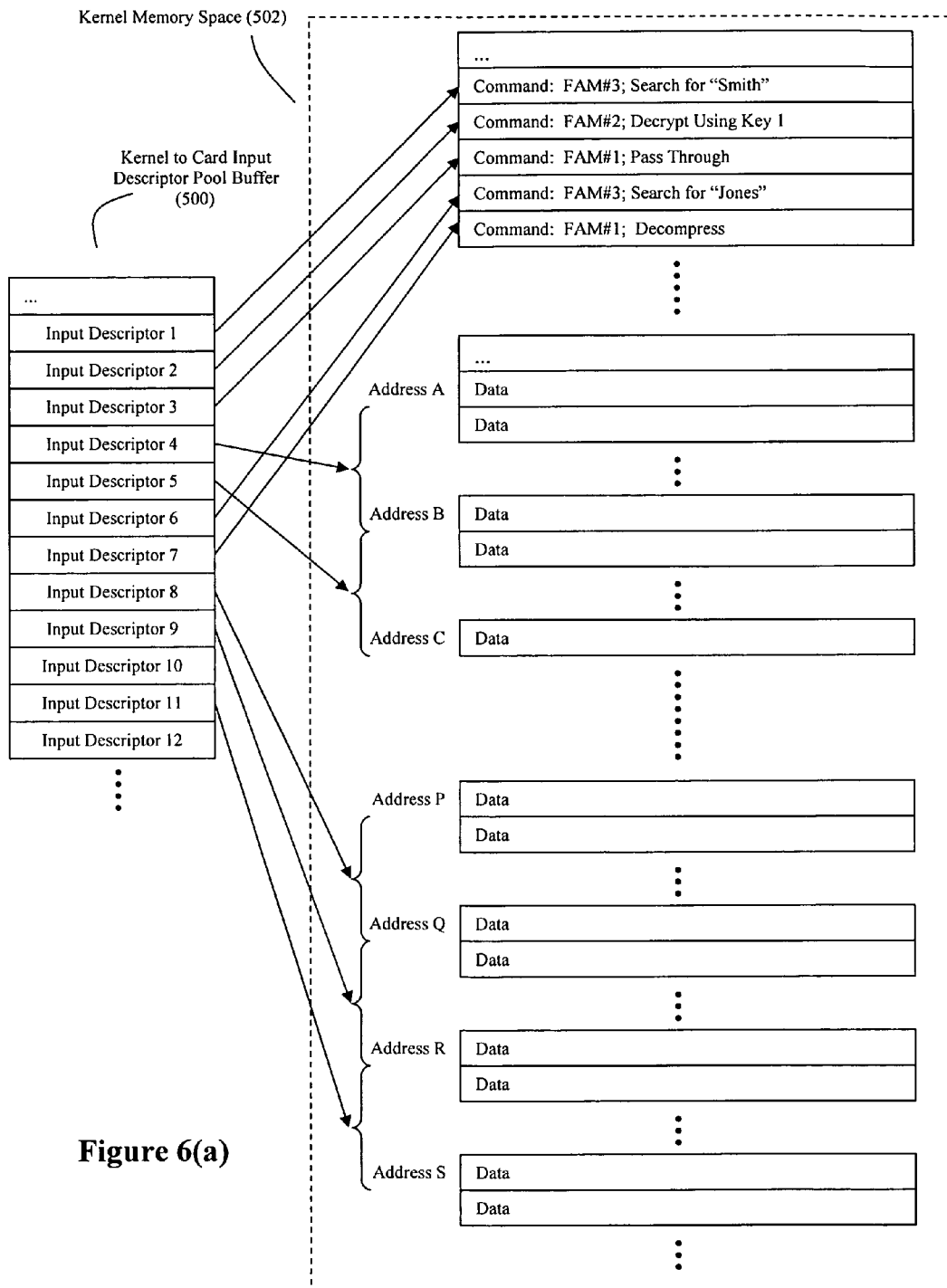
FIG. 6(a) depicts an example of the input descriptor pool buffer and kernel memory space that is managed by the device driver.
Figure 6B:
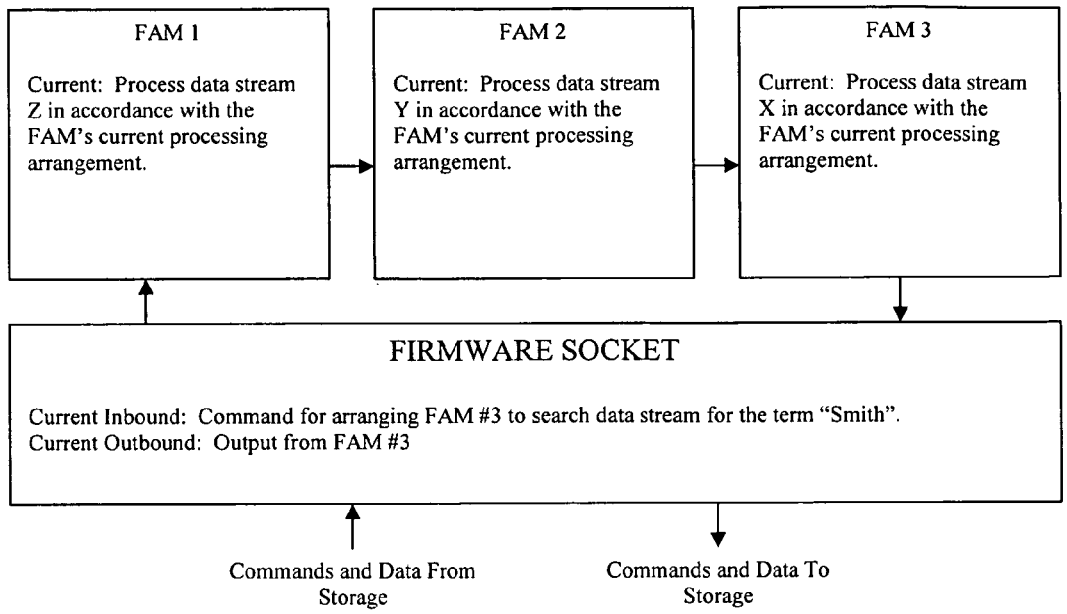
FIGS. 6(b)-(o) illustrate how commands and target data are sequenced through the firmware socket module and firmware application modules in accordance with the order of commands and target data defined by the input descriptor pool buffer example of FIG. 6(a)
Figure 6C:
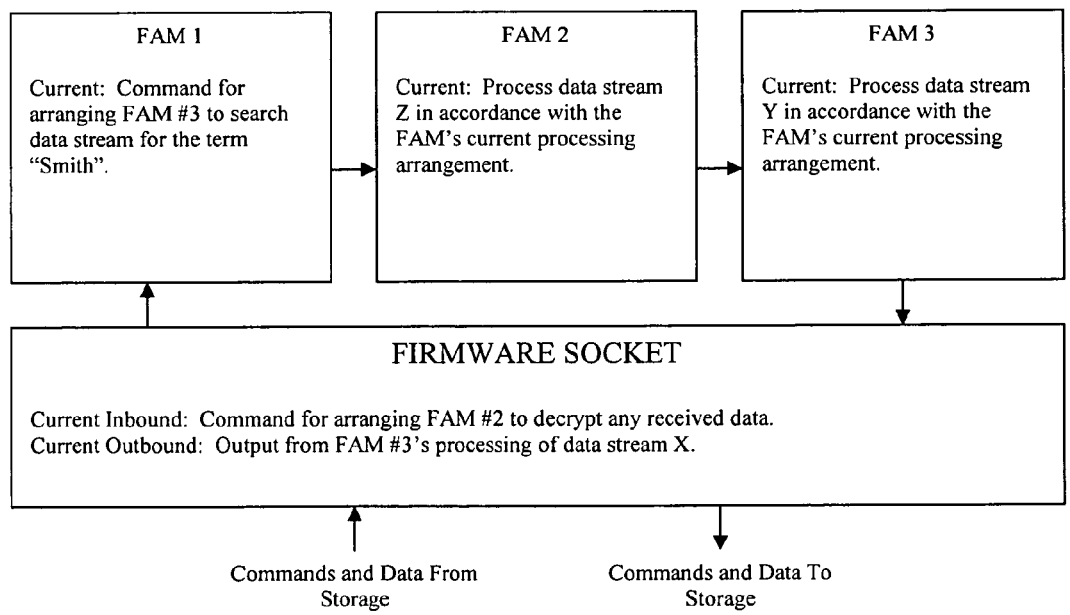
Figure 6D:
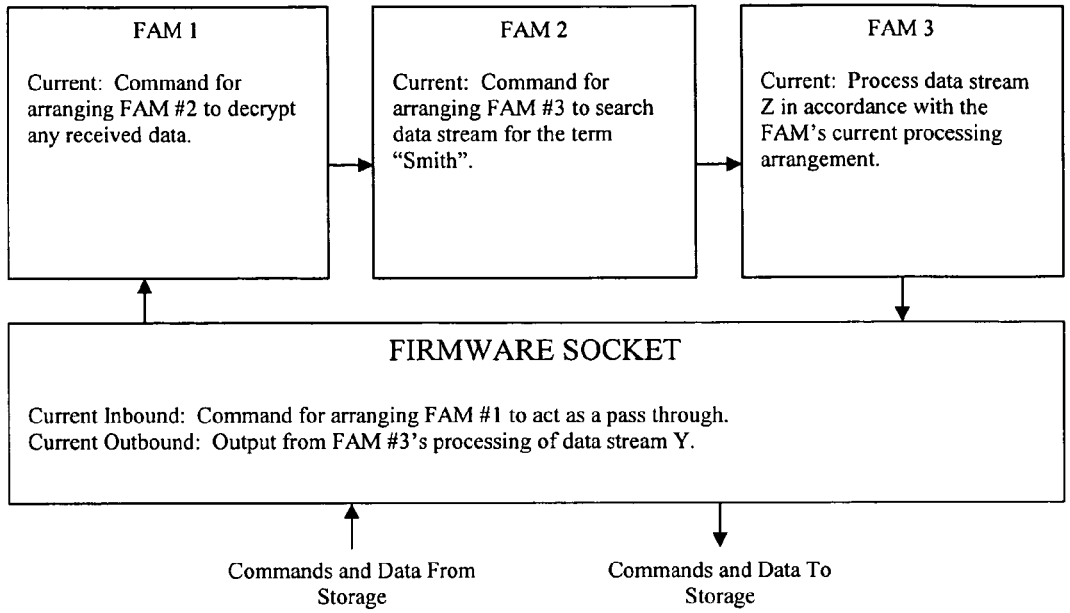
Figure 6E:
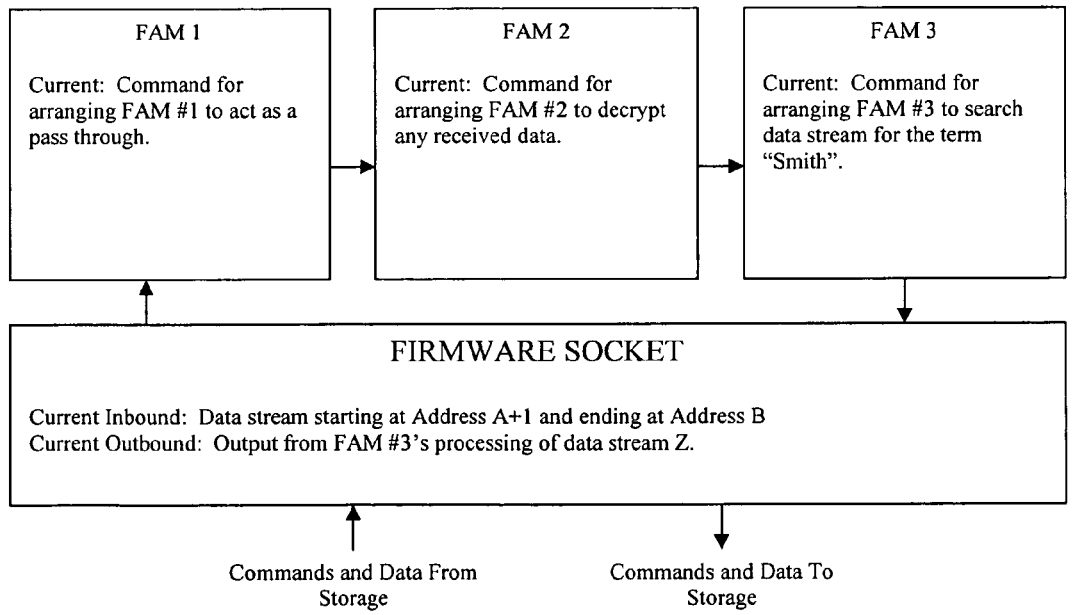
Figure 6F:
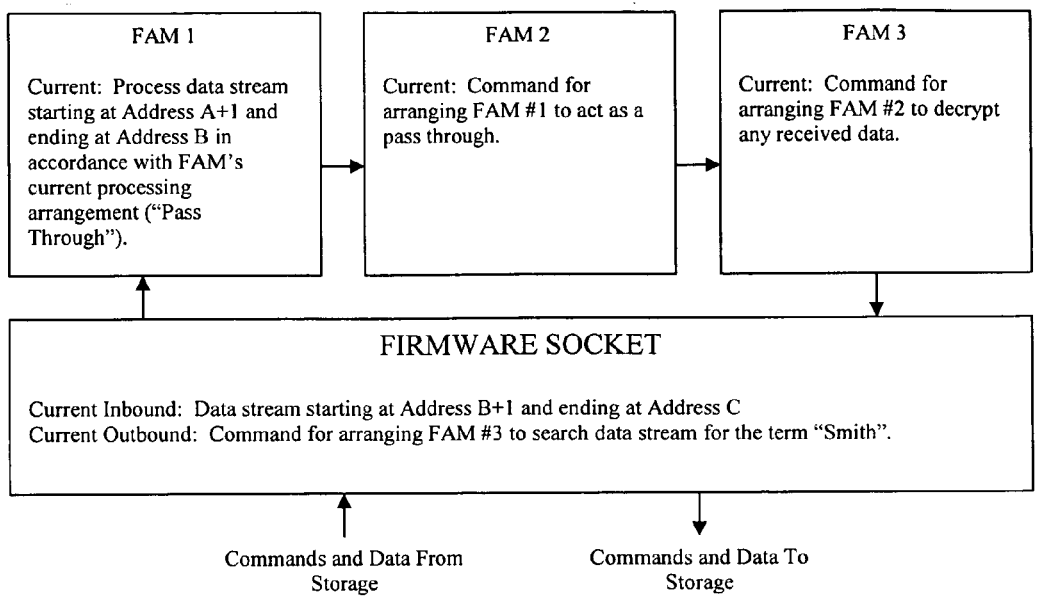
Figure 6G:
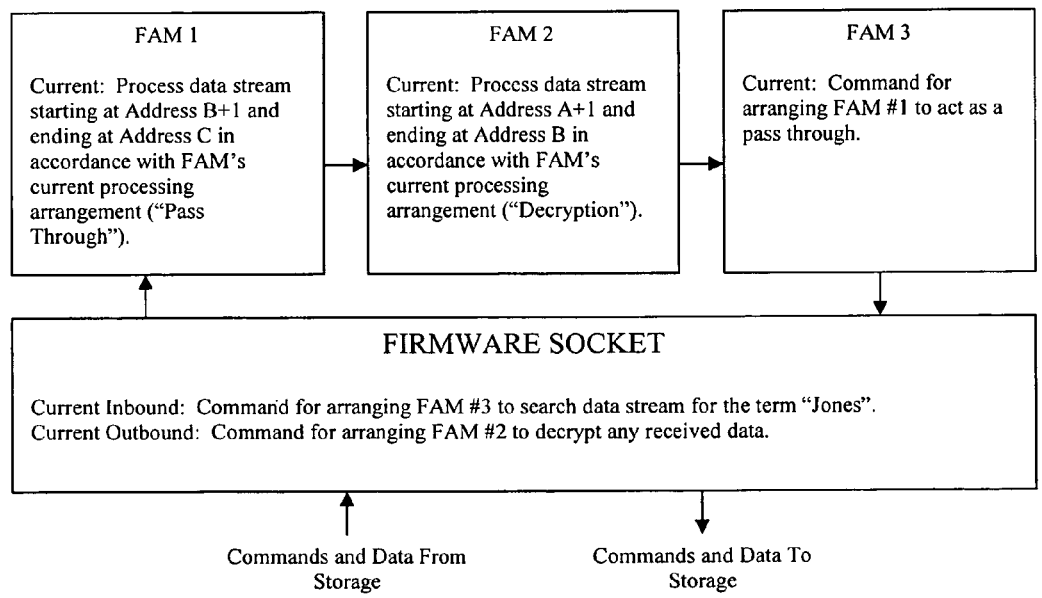
Figure 6H:
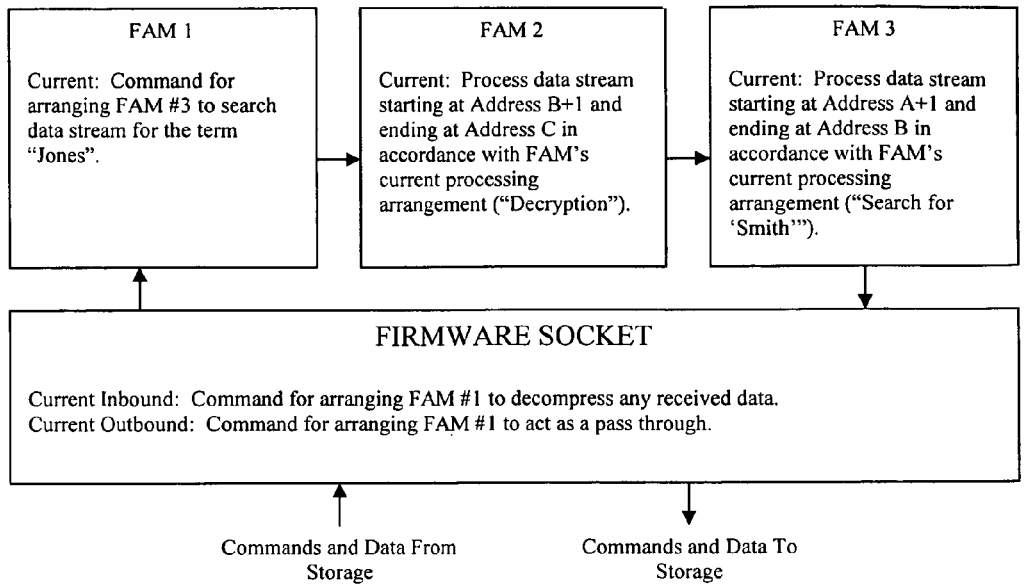
Figure 6I:
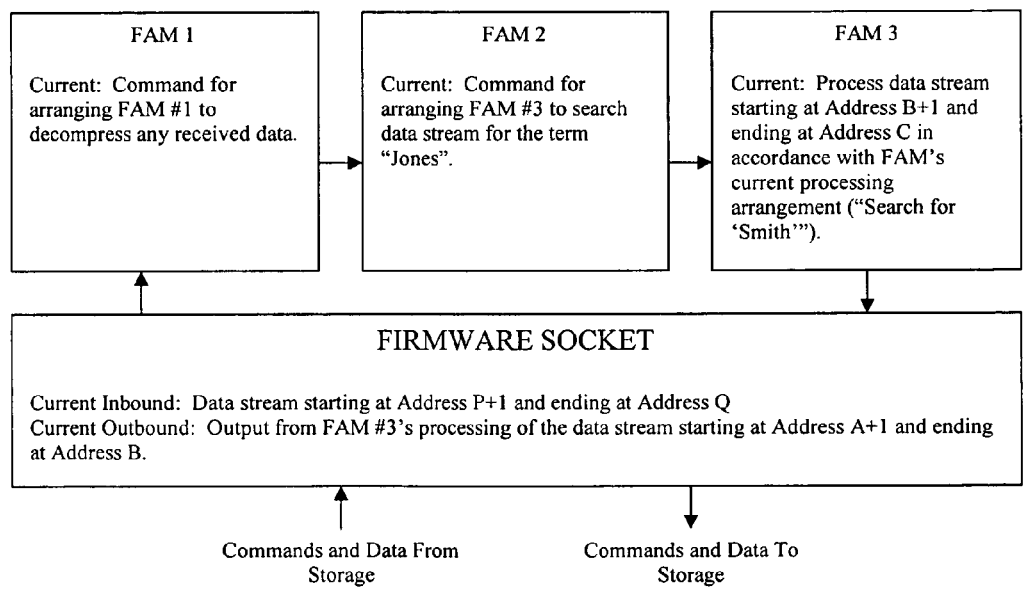
Figure 6J:
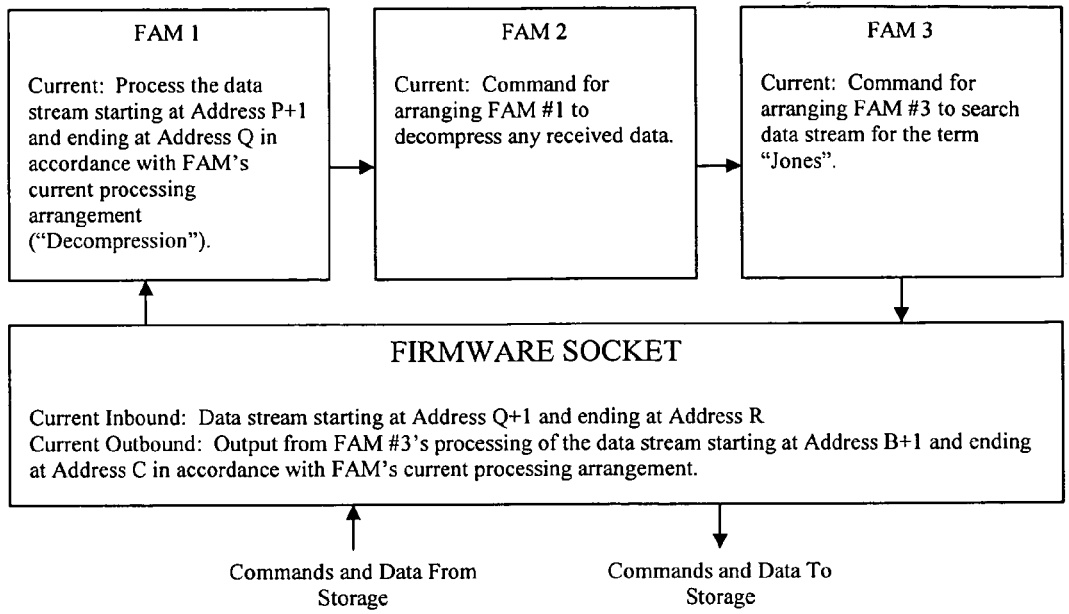
Figure 6K:
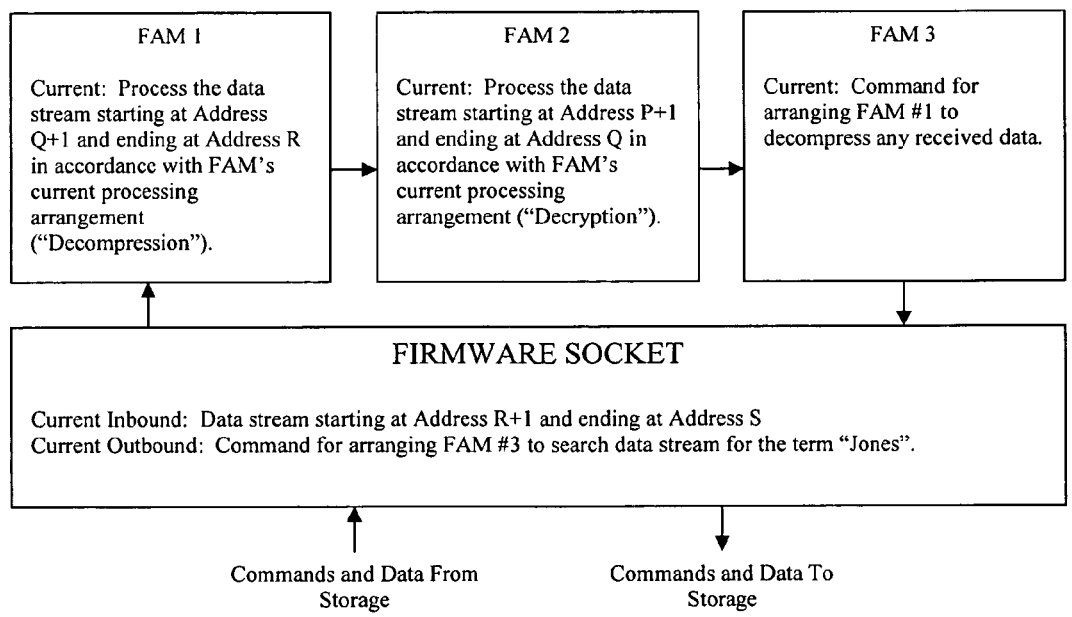
Figure 6L:
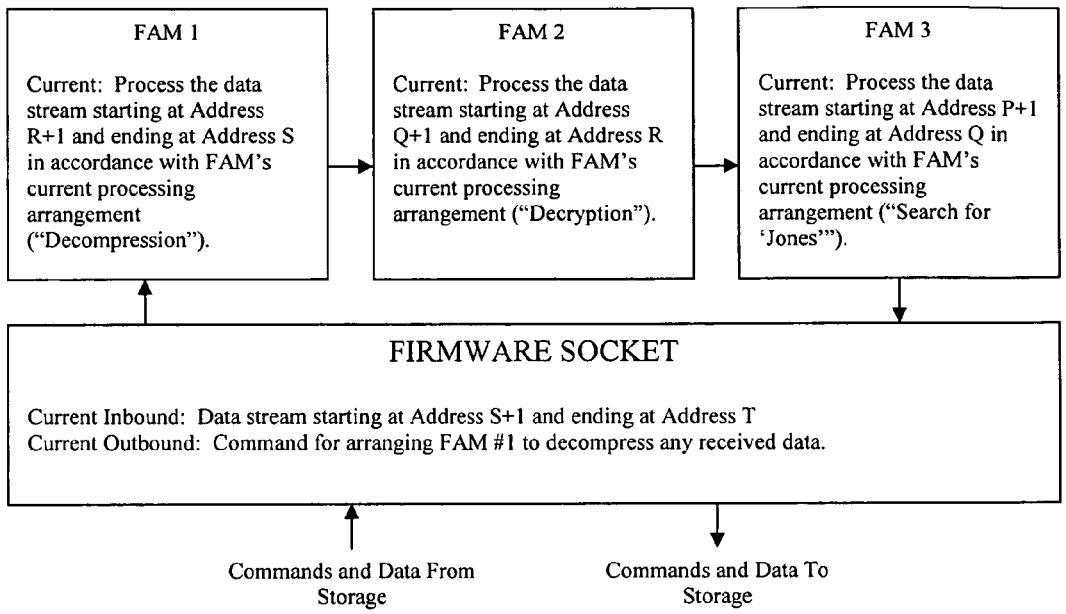
Figure 6M:
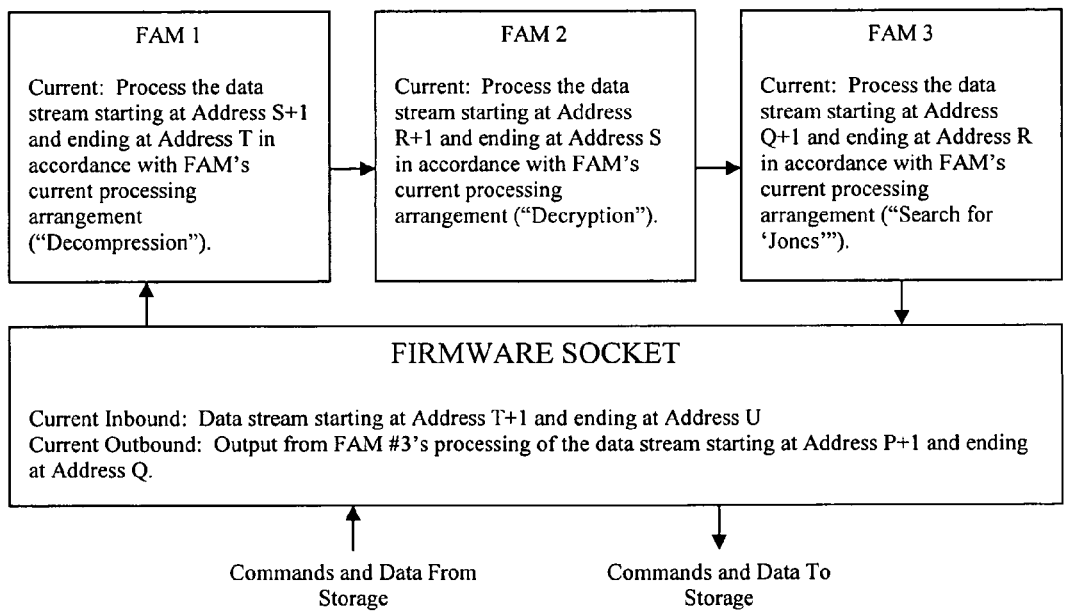
Figure 6N:
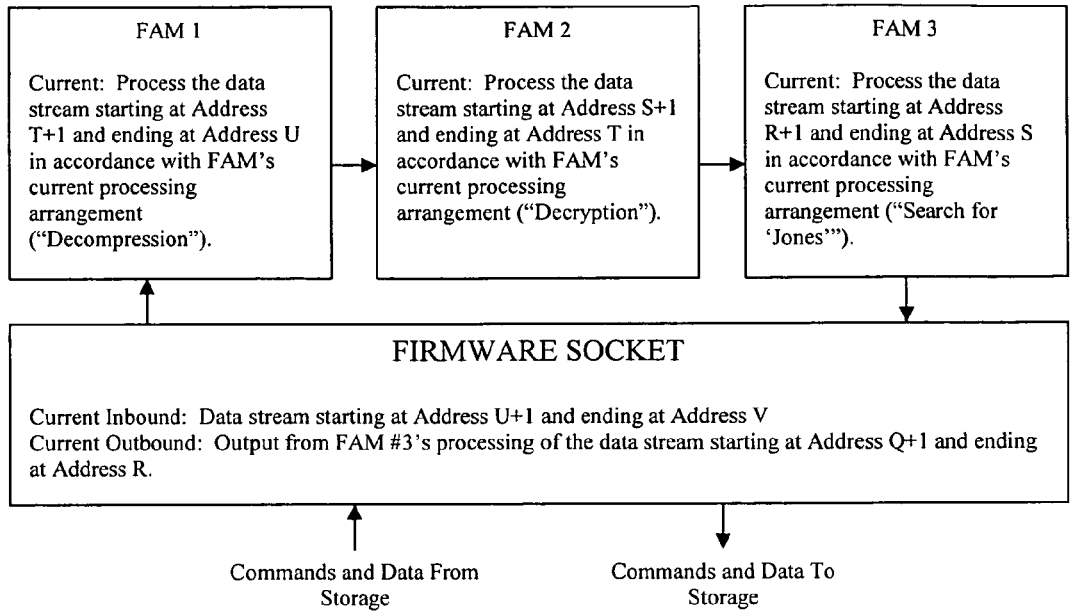
Figure 6O:
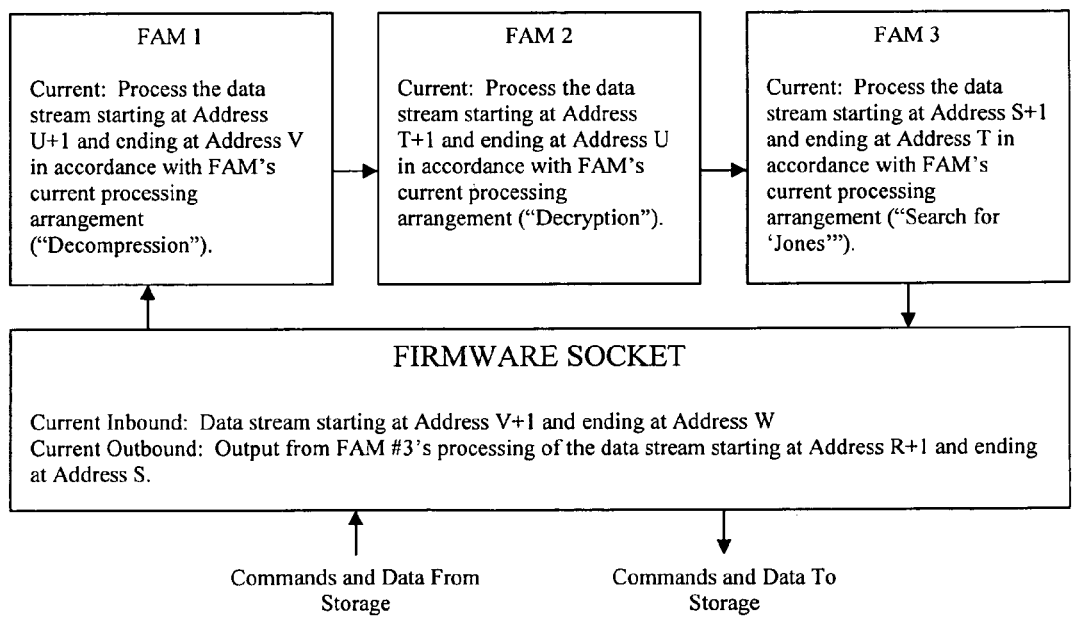

The bulk of communications between the firmware socket module 120 and the device driver software 204 preferably occurs via three sets of descriptor pools. As shown in FIG. 5, the buffers for these descriptor pools comprise a kernel to card input descriptor pool buffer 500, a card to kernel output descriptor pool buffer 504 that is for data, and a card to kernel output descriptor pool buffer 506 that is for commands. These descriptor pool buffers preferably reside in memory space that is managed by the OS kernel/device driver software 204 (for example, within RAM 110). Each entry in buffers 500, 504 and 506 comprises a descriptor, wherein each descriptor may span multiple addresses within the buffer.

In addition to the byte count fields and other flags described below, the descriptors each preferably contain the physical and virtual address of memory locations for data movement either from the software to the hardware (for an input descriptor) or from the hardware to the software (for an output descriptor). Thus, the entries in the descriptor pool buffers serve as pointers to where the firmware socket module is to read data from or write data to.

The memory space 502 from which and to which the firmware socket module is to read/write data (both commands and target data) can be any memory in the physical address space of the computer system and any physically addressable data storage device connected to the computer system. As such, memory space 502 need not be limited to the motherboard of the computer system (e.g., RAM 110). For example, if memory 304 of the card is made available to the driver level software 204, then the memory space 502 for storing commands and target data could include memory 304. Also, the memory space 502 can include addresses within data store 104 or some other system-connected storage device if the address space of data store 104 or such a storage device is made available to driver level software (e.g., through disk controller 106 for data store 104).

Preferred normal operation for the hardware/software interface 212 is as follows:

1) The software device driver 204 puts commands and data that are to be delivered to the FAMs into a set of buffers in the memory space 502. Preferably, the driver level software 204 stores target data that is to be streamed through the re-configurable logic device as a single set in contiguous addresses of memory space 502, which enhances not only the rate at which target data can be loaded into the FPGA but also provides flexibility in that consecutive descriptors pointing to such contiguously stored target data can potentially be consolidated into fewer descriptors by updating the descriptor's byte count fields appropriately.
2) The device driver 204 then builds the input descriptors that tell the firmware socket module about the content of the buffers in memory space 502. Preferably, one descriptor is used for each command or segment of M bytes of target data, wherein the size of M is variable according to a variety of factors. The size for M can be defaulted to 32 kilobytes. However, as noted this value can be variable by software giving consideration to a desire to minimize the processor overheads associated with buffer setup, descriptor management, and the like while still moving large amounts of data through the card for each descriptor. The device driver 204 also preferably builds output descriptors that tell the firmware socket module where to place data and commands that come back from the FAMs. The input descriptors are stored by the device driver 204 in the input descriptor pool buffer 500. The output descriptors that correspond to data are stored by the device driver 204 in the output descriptor pool buffer 504, and the output descriptors that correspond to commands are stored by the device driver 204 in the output descriptor pool buffer 506.

3) The device driver 204 then informs the firmware socket module that new input descriptors and output descriptors are available via a doorbell signal over communication path 510.

4) The firmware socket then reads a first input descriptor in buffer 500 to identify the location where the data (command or target data) to be delivered to the FAM chain is stored, performs a DMA transfer of the data (command or target data) from that location to the FAM chain, and moves on to the next input descriptor in the buffer 500. Thus, commands and target data are provided to the FAM chain in the same order as set within the input descriptor pool buffer 500.

5) The firmware socket module then delivers commands exiting the FAM chain to a buffer in memory space 502c as specified by the command output descriptor in buffer 506. The firmware socket module also delivers data exiting from the FAM chain to a buffer in memory space 502b as specified by the data output descriptor in buffer 504.

6) The firmware socket module then notifies the device driver (via an interrupt) that commands and/or data are available.

7) Software then invokes the appropriate data or command handler as appropriate to address the returned data and/or commands (which is controlled via the software library interface 210).

When sending information from the software to the reconfigurable logic device, all transfers (both command and data) are preferably managed by the common input descriptors stored in buffer 500. As long as individual FAMs in the FAM chain do not reorder data and commands, the order of data and commands defined by the order of input descriptors in buffer 500 will be maintained throughout processing within the reconfigurable logic device.

Strict ordering is not necessarily required for data and commands that are sent from the reconfigurable logic device back to the software. If strict synchronization is desired throughout the process (including the return of commands and data to the software), then the device driver software can set the sync bit in an individual command. When a command with the sync bit set arrives at the firmware socket module from the exit point from the FAM chain, then the firmware socket module preferably performs the following functions: (1) flush the data channel buffers to memory, (2) create a null (empty) buffer in the data channel that has a sync flag set in the data output descriptor, (3) ensure that this data output descriptor is flushed to memory, and (4) flush the command channel buffer (with the sync bit set in the command itself).

The firmware socket module 120 preferably has 16 device registers that are mapped into the memory region of the first BAR identified above (and which is configured as a 64-bit BAR). The physical addresses of each device register are the Base Address plus an offset. The registers and their offset from the BAR are listed in table 3 below:

TABLE 3

| Offset from BAR | Device Register |
| --- | --- |
| 0x00 | Firmware ID |
| 0x08 | FPGA Info |
| 0x10 | Device Status |
| 0x18 | Onboard RAM Size |
| 0x20 | Doorbell |
| 0x28 | Interrupt Status |
| 0x30 | Data-to-Card Address |
| 0x38 | Data-to-Card Count |
| 0x40 | Data-to-Card Next |
| 0x48 | Data-to-Kernel Address |
| 0x50 | Data-to-Kernel Count |
| 0x58 | Data-to-Kernel Next |
| 0x60 | Data-to-Kernel Address |
| 0x68 | Data-to-Kernel Count |
| 0x70 | Data-to-Kernel Next |
| 0x78 | Parameters |

The firmware ID is a 64-bit read-only register composed of 2 values. The least significant 32-bits are the firmware ID number and the most significant 32-bits are the revision number of the particular firmware indicated by the ID.

The FPGA information register is a 64-bit read-only register that contains 2 pieces of information—the FPGA type and the FPGA size. The FPGA type is 4 ASCII characters (32-bits) that indicate the type of FPGA. For example, if the FPGA device is a Xilinx Virtex-II device, then the FPGA type would be "xc2v". The FPGA size is a 32-bit integer that indicates what size FPGA is being used. For example, if the FPGA device is a Xilinx Virtex-II 4000, then the FPGA size would be 4000. The FPGA type is the least significant 32 bits of the FPGA information register, while the FPGA size is the most significant 32-bits of the register.

The device status register is a 64-bit read-only register containing 2 pieces of information about the hardware system attached to the hardware device. The least significant 32-bits indicate the type of hardware system that is attached to the hardware device. Table 4 below indicates an example of device type numbering.

TABLE 4

| Device Type Number | Type of Attached System |
| --- | --- |
| 0 | Invalid Device Type |
| 1 | Standalone System (no attached devices) |
| 2 | SCSI |
| 3 | IDE |
| 4 | FibreChannel |
| 5 | iSCSI |
| 6 | Reserved |

The most significant 32-bits of the device status register are an integer indicating the number of devices connected to the hardware system.

The onboard RAM size is a 64-bit register that indicates the amount of memory 304 (in kilobytes) that is attached to the FPGA device.

The doorbell register is a 64-bit read/write register that contains flags used for communication between the driver level software 204 and the firmware socket module 120. The doorbell flags and their functionalities are listed in table 5 below:

TABLE 5

| Doorbell Bit(s) | Name of Functionality |
| --- | --- |
| 0 | Run |
| 1 | Stop |
| 2 | Firmware Socket Module Reset |
| 3 | Flush |
| 4 | Strobe Debug |
| 5 | Clock Counter Reset |
| 6–63 | Reserved |

The Run bit is set by the driver level software 204 to tell the firmware socket module to start or resume running. This bit will be cleared by the firmware socket module when it is acknowledged by the hardware. The Stop bit is set by the driver level software 204 to tell the firmware socket module to stop running or pause. This bit will be cleared by the firmware socket module when it is acknowledged by the hardware. The Reset bit is set by the driver level software 204 to reset the firmware socket module and all of the FAMs in the FAM chain. This bit will be cleared by the firmware socket module when it is acknowledged by the hardware. The Flush bit is set by the driver level software 204 to flush the outbound buffer(s) on the firmware socket module that holds commands and data destined for the software. This bit will be cleared by the firmware socket module when it is acknowledged by the hardware. The Strobe Debug bit is a bit that can be used for debugging purposes. The Clock Counter Reset bit resets the counters in the firmware socket module that are used for determining the clock speed of the PCI-X bus. The clock speed of the PCI-X bus can be determined by reading the upper 9 bits of the firmware socket module parameters register.

The interrupt status register is a 64-bit read/write register that is used to notify to the driver level software 204 of the interrupt conditions listed in table 6 below. Any time an interrupt condition is set, an interrupt is triggered on the PCI-X bus to interrupt the operating system and should be responded to by the driver level software 204. If multiple interrupt conditions occur before the driver level software 204 reads the interrupt status register, then multiple bits will be set when the software reads the interrupt status register. When the interrupt status register is read, it is cleared.

TABLE 6

| Interrupt Bit | Name |
| --- | --- |
| 0 | Data-to-Card Input Descriptor Buffer Empty |
| 1 | Data-to-Card Error |
| 2 | Data-to-Card Input Descriptor Buffer Done |
| 3 | Data-to-Kernel Output Descriptor Buffer Full |
| 4 | Data-to-Kernel Error |
| 5 | Data-to-Kernel Output Descriptor Buffer Ready |
| 6 | No Results Found |
| 7 | Command-to-Kernel Output Descriptor Buffer Full |
| 8 | Command-to-Kernel Error |
| 9 | Command-to-Kernel Output Descriptor Buffer Ready |
| 10–63 | Reserved |

The firmware socket module sets Interrupt Bit 0 when it tries to read an input descriptor buffer of data and the next input descriptor buffer is not ready to be read (by checking the Ready bit of the next input descriptor queued in the buffer 500). If Interrupt Bit 0 has been written, then the driver level software 204 must write to the Run bit of the doorbell register before the firmware socket module will the input descriptor pool buffer again.

Interrupt Bit 1 signals that an error has occurred when reading an input descriptor of data destined for input to the firmware socket module.

If the interrupt flag of the input descriptor pool buffer 500 is set, then the firmware socket module will set Interrupt Bit 2 after it is done reading an input descriptor buffer of input data.

The firmware socket module sets Interrupt Bit 3 if it has data to output to the kernel, but the next data-to-kernel output descriptor buffer is unavailable (by checking the Ready bit of the next data output descriptor queued in the buffer 504). Once the firmware socket module has set this interrupt, the driver level software 204 must write to the Run bit of the doorbell register after it has made the data-to-kernel output descriptor buffer(s) available before the firmware socket module will try again to output data.

Interrupt Bit 4 signals that an error has occurred when the firmware socket module tried to write data to an output descriptor buffer.

The firmware socket module set Interrupt Bit 5 whenever it writes data to a data-to-kernel output descriptor buffer and has closed the descriptor (i.e., the firmware socket module is moving on to the next data-to-kernel descriptor buffer for writing data).

Interrupt Bit 6 is defined to indicate that there is no output data to be returned when a Flush bit has been set in the doorbell register.

The firmware socket module sets Interrupt Bit 7 if it has command data to output to the kernel, but the next command-to-kernel output descriptor buffer is unavailable (by checking the Ready bit of the next command output descriptor queued in the buffer 506). Once the firmware socket module has set this interrupt, the driver level software 204 must write to the Run bit of the doorbell register after it has made the command-to-kernel output descriptor buffer(s) available before the firmware socket module will try again to output command data.

Interrupt Bit 8 signals that an error has occurred when the firmware socket module tried to write command data to a command output descriptor buffer.

The firmware socket module sets Interrupt Bit 9 whenever it writes data to a command-to-kernel output descriptor buffer and has closed the descriptor (i.e., the firmware socket module is moving on to the next command-to-kernel descriptor buffer for writing command data).

The data-to-card address register is a 64-bit read/write register that is used to indicate the physical address of the beginning of the data-to-card input descriptor pool buffer 500. The driver level software 204 should write to this register before the Run bit of the doorbell register is written to for the first time.

The data-to-card count register is a 32-bit read/write register that is used to indicate the number of data-to-card input descriptor buffers available for reading data. The driver level software 204 should write to this register before the Run bit of the Doorbell register is written to for the first time. When this address is read from, a 64-bit value is returned wherein the upper 32 bits are padded with zeros.

The data-to-card next register is a 32-bit read/write pointer to the next data-to-card input descriptor buffer that is to be read from. This is used to ensure that the firmware socket module and the driver level software are in sync. When this address is read from, a 64-bit value is returned wherein the upper 32 bits are padded with zeros.

The data-to-kernel address register is a 48-bit read/write register that is used to indicate the physical address of the beginning of the data-to-kernel output descriptor pool buffer 504. The driver level software 204 should write to this register before the Run bit of the doorbell register is written to for the first time. When this address is read from, a 64-bit value is returned wherein the upper 16 bits are padded with zeros.

The data-to-kernel count register is a 32-bit read/write register that is used to indicate the number of data-to-kernel output descriptor buffers available for writing data. The driver level software 204 should write to this register before the Run bit of the Doorbell register is written to for the first time. When this address is read from, a 64-bit value is returned wherein the upper 32 bits are padded with zeros.

The data-to-kernel next register is a 32-bit read/write pointer to the next data-to-kernel output descriptor buffer that is to be written to. This is used to ensure that the firmware socket module and the driver level software are in sync. When this address is read from, a 64-bit value is returned wherein the upper 32 bits are padded with zeros.

The command-to-kernel address register is a 48-bit read/write register that is used to indicate the physical address of the beginning of the command-to-kernel output descriptor pool buffer 506. The driver level software 204 should write to this register before the Run bit of the doorbell register is written to for the first time. When this address is read from, a 64-bit value is returned wherein the upper 16 bits are padded with zeros.

The command-to-kernel count register is a 32-bit read/write register that is used to indicate the number of command-to-kernel output descriptor buffers available for writing command data. The driver level software 204 should write to this register before the Run bit of the Doorbell register is written to for the first time. When this address is read from, a 64-bit value is returned wherein the upper 32 bits are padded with zeros.

The command-to-kernel next register is a 32-bit read/write pointer to the next command-to-kernel output descriptor buffer that is to be written to. This is used to ensure that the firmware socket module and the driver level software are in sync. When this address is read from, a 64-bit value is returned wherein the upper 32 bits are padded with zeros.

The parameters register is a 64-bit register that is used to set programmable parameters in the firmware socket module. Some of these parameters are read/write while others are read-only as depicted in table 7 below.

TABLE 7

| Bits | Parameter | Read/Write |
|---|---|---|
| 5–0 | Max PCI-X Burst Size | Read/Write |
| 54–6 | Reserved | Read/Write |
| 55 | Bus Speed Valid | Read-Only |
| 63–56 | PCI-X Bus Speed | Read-Only |

The Max PCI-X Burst Size parameter is used to set the maximum size transaction that the firmware socket module will try to execute on the PCI-X bus 112. This maximum transaction size will be the 6-bit value in the parameters register times 128, although setting this field to zero will set the maximum transaction size to 4096 (the maximum transaction size allowed by the PCI-X specification).

Bit 55 of the parameters register is used to indicate if the PCI-X bus speed in the upper 8 bits of this register is valid (wherein a "1" indicates validity and a "0" indicates invalidity).

The most significant 8 bits of the parameters register indicates the calculate speed of the PCI-X bus in MHz. The Bus Speed Valid bit (bit 55) should also be read to determine if this value is valid or not. If the PCI-X Bus Speed value is not valid, the driver level software should wait a short time and reread the value.

As discussed, communications between the firmware socket module and the driver level software 204 occurs using 3 sets of descriptors—1 input descriptor pool and 2 output descriptor pools (one for commands and the other for data). Each pool has its own set of descriptors which contain flags and fields with information about the descriptor buffers (kernel buffers).

Each descriptor is preferably 32 bytes long, broken down into 4 pieces of 8 bytes each, as shown in table 8 below:

TABLE 8

| Number of Bytes | Field |
|---|---|
| 8 | Flags |
| 8 | Byte Count |
| 8 | Physical Address |
| 8 | Virtual Address |

The flags field is a 64-bit field containing information about the descriptor buffer as described in table 9 below:

TABLE 9

| Bit(s) | Flag Name |
|---|---|
| 0 | Busy |
| 1 | Command/Data |
| 2 | Data-to-Kernel |
| 3 | Data-to-Card |
| 4 | Ready |
| 5 | Done |
| 6 | Interrupt |
| 7–63 | Reserved |

The Busy bit is set by the driver level software 204 to indicate that the descriptor buffer is in use.

The Command/Data bit is used to tell the firmware socket module whether the buffer contains command information or data. If the buffer contains command information, this bit should be set; otherwise this bit should be cleared. The firmware socket module reads this bit on the data-to-card input descriptor buffers and marks all the data in that buffer appropriately (as either command or data).

The Data-to-Kernel bit indicates whether or not the data in the buffer is destined for the driver level software 204 (the kernel). If this bit is set, the data is output from the firmware socket module, destined for the kernel. The firmware socket module is responsible for setting this bit. Either this bit or the Data-to-Card bit should always be set, but never both.

The Data-to-Card bit indicates whether the data in the buffer is destined for the firmware socket module (deployed on the card). If this bit is set, the data is input to the firmware socket module from the driver level software 204. The driver level software 204 is responsible for setting this bit. Either this bit or the Data-to-Kernel bit should always be set, but never both.

The Ready bit is set by the driver level software 204 to indicate that a buffer is ready for use by the firmware socket module. The firmware socket module should clear this bit when it processes the buffer.

The Done bit is set by the firmware socket module to indicate to the driver level software 204 that the firmware socket module has finished processing the buffer. Driver level software 204 should clear this bit when it has finished cleaning up the buffer.

The Interrupt bit is set by the driver level software to instruct the firmware socket module to interrupt with a Data-to-Card Descriptor Buffer Done Interrupt after it has processed this buffer.

The byte count field is a 64-bit field that contains a byte count for the buffer. The meaning of the byte count differs for input and output descriptor buffers. For data-to-card input descriptor buffers, the byte count field is the number of bytes of data contained in the buffer. The firmware socket module only uses 20 bits for the incoming byte count, thus the maximum data-to-card buffer that the firmware socket module can handle is (1 MB-1) bytes. This byte count value should be set by the driver level software 204. For the data-to-kernel and command-to-kernel output descriptor buffers, the byte count is initially set by the driver level software 204 to indicate how many bytes are available in the buffer for writing. When the firmware socket module sets the done bit on the buffer, it should also update the byte count with the actual number of bytes written to the buffer. This will also be a maximum of (1 MB-1) bytes.

The physical address field is a 64-bit field containing the physical address of the kernel buffer in main memory. This field is set by the driver level software 204. Preferably, the firmware socket module only handles physical addresses that can be represented in 48 bits.

The virtual address field is a 64-bit field that contains the virtual address of the kernel buffer and is used only by the driver level software 204.

In operation, when the firmware socket module receives a Run signal on its doorbell register, the firmware socket module will read and continue to read data-to-card input descriptors in the buffers 500 until it tries to read from a buffer that is not ready or until there is command information or data in an output FIFO maintained by the firmware socket module.

The firmware socket module preferably gives command information for output the highest priority. If there is any command information for output, the firmware socket module will output it to an available Command-to-Kernel output descriptor buffer 506. If such a buffer 506 is unavailable, the firmware socket module will issue a Command-to-Kernel Output Descriptor Buffer Full interrupt. The firmware socket will then not try to output command information to a buffer 506 again until the Run bit in the doorbell register is written to by the driver level software 204 to indicate that buffers 506 have been made available.

The firmware socket module preferably gives data for output the second highest priority. If the amount of data in the firmware socket module's output FIFO is greater than or equal to the maximum PCI-X burst size, then the firmware socket module will output data to an available data-to-kernel output descriptor buffer 504. If the next data-to-kernel buffer 504 is unavailable, the firmware socket module will signal a Data-to-Kernel Output Descriptor Buffer Full interrupt. The firmware socket module will then not try to output data to a buffer 504 again until the Run bit in the doorbell register is written to by the driver level software 204 to indicate that buffers 504 have been made available.

The firmware socket module preferably gives incoming data or commands the lowest priority. If the next data-to-card input descriptor buffer 500 is unavailable, then the firmware socket module will signal a Data-to-Card Input Descriptor Buffer Empty interrupt. The firmware socket module will not try to read the next buffer 500 again until the Run bit of the doorbell register is written to by the driver level software 204, indicating that the buffers 500 have been filled.

The firmware socket module will also preferably continue processing buffers 500, 504, and 506 in order until the Next pointer reaches the Count, at which point the Next pointer will reset to the first buffer.

FIG. 6(*a*) illustrates an example of how inbound data and commands can be processed by the system 100. The input descriptor pool buffer 500 of FIG. 6(*a*) stores a plurality of descriptors, the descriptors including pointers to addresses in memory space 502 where commands and target data are stored. In this example, pointer 1 points to a command that arranges FAM#3 in a FAM chain 130 to perform a search for the term "Smith" in a data stream. Pointers to other commands are identified in FIG. 6(*a*). Buffer 500 also stores descriptors that point to target data that is to be processed through the system 100 (see, for example, pointer 4). As indicated, the driver level software 204 will populate the buffer 500 with these descriptors, thereby defining the order of commands and data that are to be delivered to the firmware socket module and propagated through the FAM chain.

FIGS. 6(*b*)-(*o*) depict such propagation using the order defined by the example of FIG. 6(*a*). For ease of illustration, SD and ED commands are omitted at the boundaries of the target data in the buffer 500. As can be seen, the defined order between commands and target data is maintained by the firmware socket module and FAM chain as these commands and data are processed through the FPGA. By appropriately ordering commands and target data in the input descriptor buffer, the software can achieve powerful high speed data processing operations. For example, the descriptors in buffer 500 corresponding to pointers 1-5 are effective to perform a decryption operation on encrypted target data stored in memory from Address A+1 through C followed by a search through the decrypted data for the presence of the term "Smith". Also, presuming that the data stored in memory from Address P+1 through W has been compressed after being encrypted, the descriptors in buffer 500 corresponding to pointers 6 et seq. are effective to perform a decompression operation on that target data, followed by a decryption operation on the decompressed target data, followed by a search through the decrypted and decompressed target data for the presence of the term "Jones". It is also worth noting that in practice, the length of target data processed following a set of commands is likely to be considerably greater than the example shown in FIGS. 6(*a*)-(*o*), for example the length of target data can be on the order of megabytes, gigabytes, and even terabytes (or greater) depending upon the scope of the desired data processing operation.

Software Library Interface 210

The software API that supports application use of FAMs is preferably embodied in a class, such as a class that could be labeled ExegyFpga. This class preferably includes the following public methods:

```
bool ExegyFpga::SendCommand ( const char   *   TwoChars,
                              const it ModuleID,
                              const unsigned int Parameter,
                              const bool WaitForIt,
                              const bool Sync )
```

The SendCommand method delivers the given command to the firmware socket module and FAMs via the command channel. The argument "TwoChars" is a pair of bytes (typically ASCII characters, but this need not be the case) that goes in the command field (16 bits). The error field is cleared (set to 0). The argument "Sync" goes in the sync field (1 bit). The argument "ModuleId" goes in the Module ID field (6 bits). The argument "Parameter" goes in the parameters field (32 bits). The argument "WaitForIt" is a flag that indicates whether the method invocation should block (if WaitForIt is 1) or not block (if WaitForIt is 0) until the command returns from the firmware. The method returns false on error.

size_t ExegyFpga::Write (size_t bytes, char*buffer

The Write method delivers data from the given buffer to the data channel. The method returns the number of bytes transferred or an error in "errno".

size_t ExegyFpga::ReadCmd (size_t bytes, char*buffer)

The ReadCmd method reads commands from the Command-to-Kernel output descriptor buffer(s) and delivers them to a user buffer. This method returns bytes placed in the buffer.

size_t ExegyFpga::Read(size_t bytes, char*buffer

The Read method reads data from the Data-to-Kernel output descriptor buffer(s) and delivers them to a user buffer. This method returns bytes placed in the buffer or an "errno". ENODATA is returned on a sync mark being encountered (i.e., the null buffer which is the result of a command sync bit).

An exemplary use of the software library interface is illustrated below.

```
Card = ExegyFpga::Open(...);
Card->SendCommand(...);    //send a command to FAM chain
Card->Write(...);          //send test data
Card->ReadCmd(..);         //ensure command made it
Card->Read(...);           //read test data
Card->Close( );
```

While the present invention has been described above in relation to its preferred embodiment, various modifications may be made thereto that still fall within the invention's scope. Such modifications to the invention will be recognizable upon review of the teachings herein. As such, the full scope of the present invention is to be defined solely by the appended claims and their legal equivalents.

What is claimed is:

1. A method of interfacing a reconfigurable logic device with a processor and a memory that are external to the reconfigurable logic device, the reconfigurable logic device comprising at least one firmware application module, the firmware application module configured to perform a command-specified data processing operation, the method comprising:

the processor writing a plurality of descriptors to a buffer, each descriptor identifying a location in the external memory where an associated block of information for a direct memory access (DMA) transfer is stored, the descriptors comprising a plurality of command descriptors and a plurality of target data descriptors, each command descriptor corresponding to a command information block that defines the data processing operation for the at least one firmware application module, each target data descriptor corresponding to a target data information block that defines target data for delivery to the at least one firmware application module for the at least one firmware application module to perform the command-specified data processing operation upon;

the reconfigurable logic device receiving an indication from the processor that information is available in the external memory for the DMA transfer into the reconfigurable logic device;

in response to the received indication, the reconfigurable logic device (1) reading a descriptor from the buffer, (2) performing the DMA transfer of the information block identified by the read descriptor from the external memory to the reconfigurable logic device, (3) monitoring whether the DMA transfer is to continue, and (4) repeating the reading and performing steps for the other descriptors in the buffer to thereby transfer the information blocks as a stream into the reconfigurable logic device without requiring intervention by the processor apart from the writing step so long as the monitoring step results in a determination that the DMA transfer is to continue, the stream comprising interleaved command information blocks and target data information blocks such that the at least one firmware application module continuously processes command information blocks and target data information blocks without interruption even when the stream transitions from a target data information block to a command information block and from a command information block to a target data information block.

2. The method of claim 1 wherein the reconfigurable logic device is configured with a firmware socket module, and wherein the receiving, reading, performing, monitoring and repeating steps are performed by the firmware socket module, the method further comprising the firmware socket module providing the transferred information blocks to the at least one firmware application module.

3. The method of claim 2 wherein the at least one firmware application module comprises a plurality of the firmware application modules arranged in a pipeline.

4. The method of claim 3 wherein the command information blocks comprise a plurality of commands that define the data processing operations for the firmware application modules.

5. The method of claim 4 wherein each of a plurality of the command descriptors comprises a pointer to a location for a command information block in the external memory, and wherein each of a plurality of the target data descriptors comprises a pointer to a location for a target data information block in the external memory, wherein the command descriptors and the target data descriptors are interleavedly stored in the buffer in a defined order, wherein the reading step comprises reading the descriptors in accordance with the defined order, and wherein the DMA transfer performing step comprises transferring the command information blocks and target data information blocks from the external memory to the reconfigurable logic device in accordance with the defined order.

6. The method of claim 5 wherein the providing step comprises the firmware socket module providing the transferred command information blocks and target data information blocks to the pipeline in accordance with the defined order.

7. The method of claim 5 wherein the DMA transfer performing step comprises performing the DMA transfer of the command information blocks and target data information blocks over a common communications path.

8. The method of claim 5 wherein each descriptor comprises an address in the external memory where the associated information block is stored.

9. The method of claim 8 wherein the address comprises a physical and virtual memory location address.

10. The method of claim 8 wherein the target data information blocks corresponding to contiguously ordered descriptors in the buffer are stored in the external memory in contiguous addresses.

11. The method of claim 8 wherein each descriptor further comprises a byte count field that identifies a size for the associated information block.

12. The method of claim 11 wherein each descriptor further comprises a flag that identifies whether the associated information block corresponds to a command or to target data.

13. The method of claim 5 wherein the descriptors read during the reading step comprise input descriptors;
wherein the writing step further comprises the processor writing a plurality of output descriptors to a buffer, each output descriptor identifying a location in the external memory where an associated block of information exiting the reconfigurable logic device is to be stored; and
wherein the reading step comprises the firmware socket module reading an output descriptor from the buffer in which the output descriptors are stored;
wherein the DMA transfer performing step comprises the firmware socket module performing an outbound DMA transfer of an exiting information block from the reconfigurable logic device to the location in the external memory identified by the read output descriptor; and
wherein the repeating step comprises the firmware socket module repeating the output descriptor reading step and the outbound DMA transfer performing step for the other output descriptors in the buffer in which the output descriptors are stored to thereby transfer the exiting information blocks as a stream out of the reconfigurable logic device without intervention by the processor apart from the input and output descriptor writing steps so long as the monitoring step results in a determination that the DMA transfers are to continue.

14. The method of claim 13 wherein the exiting information blocks comprise processed command information blocks and processed target data information blocks.

15. The method of claim 14 wherein the output descriptor reading step comprises (1) reading output descriptors for processed command information blocks from a first output descriptor buffer, and (2) reading output descriptors for processed target data information blocks from a second output descriptor buffer.

16. The method of claim 15 further comprising the firmware socket module storing a plurality of registers, the plurality of registers identifying (1) a current input descriptor to be read, (2) a count indicative of a size for the buffer in which the input descriptors are stored, (3) a next input descriptor to be read, (4) a current output descriptor for a processed command information block to be read, (5) a count indicative of a size for the first output descriptor buffer, (6) a next output descriptor for a processed command information block to be read, (7) a current output descriptor for a processed target data information block to be read, (8) a count indicative of a size for the second output descriptor buffer, and (9) a next output descriptor for a processed target data information block to be read, wherein the firmware socket module performs the reading, DMA transferring, monitoring and repeating steps based on the data stored in the registers.

17. The method of claim 14 further comprising the firmware socket module managing a data flow to and from the reconfigurable logic device in a accordance with a defined priority by giving outgoing processed command information blocks a highest priority, giving outgoing processed target data information blocks a next highest priority and giving incoming command information blocks and target data information blocks a lowest priority.

18. The method of claim 13 further comprising the firmware socket module informing the processor that the exiting information blocks are available after performing the DMA transfer for the exiting information blocks.

19. The method of claim 5 further comprising the firmware socket module storing a plurality of registers, the plurality of registers identifying (1) a current descriptor to be read, (2) a count indicative of a size for the buffer, and (3) a next descriptor to be read, wherein the firmware socket module performs the reading, DMA transferring, monitoring and repeating steps based on the data stored in the registers.

20. The method of claim 5 wherein a plurality of the command information blocks are specific to individual ones of the firmware application modules.

21. The method of claim 5 wherein at least one of the command information blocks comprises a pass through command to one of the firmware application modules.

22. The method of claim 5 wherein the data processing operations defined by the command information blocks comprise at least two members selected from the group consisting of a search operation, a data reduction operation, an encryption operation, a decryption operation, a compression operation, a decompression operation, and a pass through operation.

23. The method of claim 4 wherein at least one of the command information blocks comprises a command for configuring a firmware application module to perform at least one member selected from the group consisting of a search operation, a data reduction operation, an encryption operation, a decryption operation, a compression operation, a decompression operation, and a pass through operation.

24. The method of claim 1 wherein the buffer comprises a buffer located in a memory space managed by the main processor.

25. The method of claim 24 wherein the buffer comprises a Random Access Memory (RAM).

26. The method of claim 1 wherein the external memory comprises memory within the memory space of the processor.

27. The method of claim 26 wherein the memory space comprises a kernel memory space for the processor.

28. The method of claim 26 wherein the external memory comprises a Random Access Memory (RAM).

29. The method of claim 1 wherein the external memory comprises a physically addressable data storage device.

30. The method of claim 1 wherein the reconfigurable logic device comprises a field programmable gate array (FPGA).

31. An apparatus for interfacing a reconfigurable logic device with a processor and a memory that are external to the reconfigurable logic device, the reconfigurable logic device comprising at least one firmware application module, the firmware application module configured to perform a command-specified data processing operation, the apparatus comprising:
the processor, the processor configured to write a plurality of descriptors to a buffer, each descriptor identifying a location in the external memory where an associated block of information for a direct memory access (DMA) transfer is stored, the descriptors comprising a plurality of command descriptors and a plurality of target data descriptors, each command descriptor corresponding to a command information block that defines the data processing operation for the at least one firmware application module, each target data descriptor corresponding to a target data information block that defines target data for delivery to the at least one firmware application module for the at least one firmware application module to perform the command-specified data processing operation upon; and the reconfigurable logic device, the reconfigurable logic device for communication with the external memory and the processor, the reconfigurable logic device configured to: (1) receive an indication from the processor that information is available in the external memory for the DMA transfer, and (2) in response to the received indication, (i) perform a read operation on a descriptor in the buffer, (ii) perform the DMA transfer of the information block identified by the read descriptor from the external memory to the reconfigurable logic device, (iii) monitor whether the DMA transfer is to continue, and (iv) repeat the read operation and the DMA transfer for the other descriptors in the buffer to thereby transfer the information blocks as a stream into the reconfigurable logic device without requiring intervention by the processor apart from the write operation so long as the monitoring operation results in a determination that the DMA transfer is to continue, the stream comprising interleaved command information blocks and target data information blocks such that the at least one firmware application module will continuously process command information blocks and target data information blocks without interruption even when the stream transitions from a target data information block to a command information block and from a command information block to a target data information block.

32. The apparatus of claim 31 wherein the reconfigurable logic device comprises firmware socket module, the firmware socket module configured to perform the receive operation, the read operation, the DMA transfer operation, the monitoring operation and the repeating operation, and wherein the firmware socket module is further configured to provide the transferred information blocks to the at least one firmware application module.

33. The apparatus of claim 32 wherein the at least one firmware application module comprises a plurality of the firmware application modules arranged in a pipeline.

34. The apparatus of claim 33 wherein the command information blocks comprise a plurality of commands that define the data processing operations for the firmware application modules.

35. The apparatus of claim 34 wherein each of a plurality of the command descriptors comprises a pointer to a location for a command information block in the external memory, and wherein each of a plurality of the target data descriptors comprises a pointer to a location for a target data information block in the external memory, wherein the command descriptors and the target data descriptors are interleavedly stored in the buffer in a defined order, wherein the firmware socket module is further configured to (1) perform the read operation by reading the descriptors in accordance with the defined order, and (2) perform the DMA transfer operation by transferring the command information blocks and target data information blocks from the external memory to the reconfigurable logic device in accordance with the defined order.

36. The apparatus of claim 35 wherein the firmware socket module is further configured to provide the transferred command information blocks and target data information blocks to the pipeline in accordance with the defined order.

37. The apparatus of claim 35 wherein the firmware socket module is further configured to perform the DMA transfer of the command information blocks and target data information blocks over a common communications path.

38. The apparatus of claim 35 wherein each descriptor comprises an address in the external memory where the associated information block is stored.

39. The apparatus of claim 38 wherein the address comprises a physical and virtual memory location address.

40. The apparatus of claim 38 wherein the target data information blocks corresponding to contiguously ordered descriptors in the buffer are stored in the external memory in contiguous addresses.

41. The apparatus of claim 38 wherein each descriptor further comprises a byte count field that identifies a size for the associated information block.

42. The apparatus of claim 41 wherein each descriptor further comprises a flag that identifies whether the associated information block corresponds to a command or to target data.

43. The apparatus of claim 35 wherein the descriptors read during the read operation comprise input descriptors, wherein the processor is further configured to perform the writing operation by also writing a plurality of output descriptors to a buffer, each output descriptor identifying a location in the external memory where an associated block of information exiting the reconfigurable logic device is to be stored, and wherein the firmware socket module is further configured to (1) perform the read operation by also reading an output descriptor from the buffer in which the output descriptors are stored, (2) perform the DMA transfer also performing an outbound DMA transfer of an exiting information block from the reconfigurable logic device to the location in the external memory identified by the read output descriptor, and (3) perform the repeating operation by also repeating the output descriptor read operation and the outbound DMA transfer for the other output descriptors in the buffer in which the output descriptors are stored to thereby transfer the exiting information blocks out of the reconfigurable logic device as a stream without intervention by the processor apart from the input and output descriptor write operations so long as the monitoring operation results in a determination that the DMA transfers are to continue.

44. The apparatus of claim 43 wherein the exiting information blocks comprise processed command information blocks and processed target data information blocks.

45. The apparatus of claim 44 wherein the firmware socket module is further configured to perform the output descriptor read operation by (1) reading output descriptors for processed command information blocks from a first output descriptor buffer, and (2) reading output descriptors for processed target data information blocks from a second output descriptor buffer.

46. The apparatus of claim 45 wherein the firmware socket module is further configured to (1) store a plurality of registers, the plurality of registers identifying (i) a current input descriptor to be read, (ii) a count indicative of a size for the buffer in which the input descriptors are stored, (iii) a next input descriptor to be read, (iv) a current output descriptor for a processed command information block to be read, (v) a count indicative of a size for the first output descriptor buffer, (vi) a next output descriptor for a processed command information block to be read, (vii) a current output descriptor for a processed target data information block to be read, (viii) a count indicative of a size for the second output descriptor buffer, and (ix) a next output descriptor for a processed target data information block to be read, and (2) perform the read operation, DMA transfer operation, monitoring operation and repeating operation based on the data stored in the registers.

47. The apparatus of claim 44 wherein the firmware socket module is further configured to manage a data flow to and from the reconfigurable logic device in a accordance with a defined priority by giving outgoing processed command information blocks a highest priority, giving outgoing processed target data information blocks a next highest priority and giving incoming command information blocks and target data information blocks a lowest priority.

48. The apparatus of claim 43 wherein the firmware socket module is further configured to inform the processor that the exiting information blocks are available after performing the DMA transfer operation for the exiting information blocks.

49. The apparatus of claim 35 wherein the firmware socket module is further configured to (i) store a plurality of registers, the plurality of registers identifying (i) a current descriptor to be read, (ii) a count indicative of a size for the buffer, and (iii) a next descriptor to be read, and (2) perform the read operation, DMA transfer operation, monitoring operation and repeating operation based on the data stored in the registers.

50. The apparatus of claim 35 wherein a plurality of the command information blocks are specific to individual ones of the firmware application modules.

51. The apparatus of claim 35 wherein at least one of the command information blocks comprises a pass through command to one of the firmware application modules.

52. The apparatus of claim 35 wherein the data processing operations defined by the command information blocks comprise at least two members selected from the group consisting of a search operation, a data reduction operation, an encryption operation, a decryption operation, a compression operation, a decompression operation, and a pass through operation.

53. The apparatus of claim 34 wherein at least one of the command information blocks comprises a command for configuring a firmware application module to perform at least one member selected from the group consisting of a search operation, a data reduction operation, an encryption operation, a decryption operation, a compression operation, a decompression operation, and a pass through operation.

54. The apparatus of claim 31 further comprising the buffer, wherein the buffer is located in a memory space managed by the processor.

55. The apparatus of claim 54 wherein the buffer comprises a Random Access Memory (RAM).

56. The apparatus of claim 31 further comprising the external memory, wherein the external memory comprises memory within the memory space of the processor.

57. The apparatus of claim 56 wherein the memory space comprises a kernel memory space for the processor.

58. The apparatus of claim 56 wherein the external memory comprises a Random Access Memory (RAM).

59. The apparatus of claim 31 further comprising the external memory, wherein the external memory comprises a physically addressable data storage device.

60. The apparatus of claim 31 wherein the reconfigurable logic device comprises a field programmable gate array (FPGA).

61. The apparatus of claim 31 wherein the processor comprises a general purpose processor (GPP) configured to execute software to perform the write operation.

62. The apparatus of claim 31 wherein the at least one firmware application module is configured to perform a data reduction operation.

63. The apparatus of claim 31 wherein the reconfigurable logic device is configured to perform the receiving operation by reading data set by the processor that indicates the reconfigurable logic device is to begin running.

64. The apparatus of claim 63 wherein the reconfigurable logic device is further configured to perform the monitoring operation by checking a register to determine whether the processor has set data that indicates the reconfigurable logic device is to stop, and wherein the reconfigurable logic device is further configured to determine that the DMA transfer is not to continue based on the register checking operation resulting in a determination that the stop data has been set by the processor.

65. The apparatus of claim 64 wherein the reconfigurable logic device is further configured to perform the monitoring operation by checking whether a next descriptor is ready, and wherein the reconfigurable logic device is further configured to determine that the DMA transfer is not to continue based on the next descriptor checking operation resulting in a determination that the next descriptor is not ready.

66. The apparatus of claim 65 wherein the reconfigurable logic is further configured to read an output descriptor from a buffer to determine where data exiting the reconfigurable logic device is to be written, the buffer from which the output descriptor is read comprising a plurality of output descriptors, wherein the reconfigurable logic device is further configured to perform the monitoring operation by checking whether a next output descriptor in the buffer from which the output descriptor is read is ready, and wherein the reconfigurable logic device is further configured to determine that the DMA transfer is not to continue based on the next output descriptor checking operation resulting in a determination that the next output descriptor is not ready.

67. In a system comprising a processor, a memory, and a data processing card, all configured for communication with each other via a system bus, wherein the data processing card is configured with a plurality of data processing modules arranged in a pipeline, each data processing module configured to perform a command-specified data processing operation on any target data it receives, a method of interfacing the data processing card with the memory, the method comprising:

the processor populating a buffer with a plurality of descriptors, the descriptors comprising a plurality of command descriptors and a plurality of target data descriptors, each command descriptor identifying a location in the memory where command data for a direct memory access (DMA) transfer is stored, the command data for controlling a data processing operation performed by at least one data processing module in the pipeline, each target data descriptor identifying a location in the memory where target data for a DMA transfer is stored, wherein the command descriptors and target data descriptors are interleavedly stored in the buffer in accordance with a defined order for the command data and target data to be processed through the pipeline;

the data processing card determining that information is available in the memory for the DMA transfer;

in response to the determination that information is available in the memory for the DMA transfer, the data processing card (1) reading a descriptor from the buffer, (2) performing the DMA transfer of the command data or target data identified by the read descriptor from the memory to the data processing card, (3) monitoring whether the DMA transfer is to continue, and (4) repeating the reading and performing steps for the other descriptors in the buffer to thereby transfer the command data and target data as a stream into the data processing card without requiring intervention by the processor apart from the populating step so long as the monitoring step results in a determination that the DMA transfer is to continue, the stream comprising interleaved command data and target data such that the pipeline continuously processes command data and target data without interruption even when the stream transitions from target data to command data and from a command data to target data.

68. The method of claim 67 wherein each of the command descriptors comprises a pointer to a location for command data in the memory, and wherein each of the target data descriptors comprises a pointer to a location for target data in the memory, wherein the processor comprises a device driver, and wherein the method further comprises the device driver interleavedly storing the command descriptors and the target data descriptors in the buffer in the defined order.

69. The method of claim 68 wherein the descriptors read during the reading steps comprise input descriptors;
   wherein the populating step further comprises the device driver also populating another buffer with a plurality of output descriptors, each output descriptor identifying a location in the memory where an associated block of data exiting the pipeline is to be stored; and
   wherein the reading step comprises the data processing card reading an output descriptor from the another buffer;
   wherein the DMA transfer performing step comprises the data processing card performing an outbound DMA transfer of an exiting data block from the data processing card to the location in the memory identified by the read output descriptor; and
   wherein the repeating step comprises the data processing card repeating the output descriptor reading step and the outbound DMA transfer performing step for a next output descriptor in the another buffer to thereby transfer the exiting data blocks as a stream out of the data processing card without intervention by the processor apart from the input and output descriptor populating steps so long as the monitoring step results in a determination that the DMA transfers are to continue.

70. The method of claim 68 wherein the data processing card comprises a reconfigurable logic device, and wherein the pipeline is implemented on the reconfigurable logic device.

71. The method of claim 70 wherein the reading, DMA transfer performing, monitoring and repeating steps are performed by the reconfigurable logic device.

72. A data processing system comprising:
   a data processing card for connection to a bus to access command data and target data stored in an external memory, the data processing card configured with a plurality of data processing modules arranged in a pipeline, each data processing module configured to perform a command-specified data processing operation on any target data it receives;
   wherein the data processing card is configured to (1) receive an indication from a processor in communication with the bus that information is available in the external memory for a direct memory access (DMA) transfer into the data processing card, and (2) in response to the received indication, (i) read a plurality of descriptors from a buffer, the buffer comprising a plurality of descriptors written thereto by the processor, the descriptors comprising a plurality of command descriptors and a plurality of target data descriptors, each command descriptor identifying a location in the external memory where command data for the DMA transfer is stored, the command data for controlling a data processing operation performed by at least one data processing module in the pipeline, each target data descriptor identifying a location in the external memory where target data for the DMA transfer is stored, wherein the command descriptors and target data descriptors are interleavedly stored in the buffer in accordance with a defined order for the command data and target data to be processed through the pipeline, (ii) perform the DMA transfer of the command data and target data identified by the read descriptors from the external memory to the data processing card to thereby transfer the command data and target data as a stream into the data processing card without requiring intervention by the processor apart from the processor writing descriptors to the buffer so long as the reconfigurable logic device determines that the DMA transfer is to continue, the stream comprising interleaved command data and target data such that the pipeline will continuously process command data and target data without interruption even when the stream transitions from target data to command data and from a command data to target data.

73. The system of claim 72 further comprising the processor, the external memory and the bus.

74. The system of claim 73 wherein each of the command descriptors comprises a pointer to a location for command data in the external memory, and wherein each of the target data descriptors comprises a pointer to a location for target data in the external memory, wherein the processor comprises a device driver, the device driver being configured to interleavedly store the command descriptors and the target data descriptors in the buffer in the defined order.

75. The system of claim 74 wherein the read descriptors comprise input descriptors and wherein the device driver is further configured to perform the populating operation by also populating another buffer with a plurality of output descriptors, each output descriptor identifying a location in the external memory where an associated block of data exiting the pipeline is to be stored, and wherein the data processing card is further configured to (1) perform the read operation by also reading a plurality of output descriptors from the another buffer, each output descriptor identifying a location in the external memory to which a block of data exiting the pipeline is to be transferred from the data processing card, (2) perform the DMA transfer by also performing an outbound DMA transfer of the exiting data blocks from the data processing card to the locations in the external memory identified by the read output descriptors to thereby transfer the exiting data blocks as a stream out of the data processing card without intervention by the processor apart from the input and output descriptor population operations so long as the reconfigurable logic device determines that the DMA transfers are to continue.

76. The system of claim 72 wherein the data processing card comprises a reconfigurable logic device, and wherein the pipeline is implemented on the reconfigurable logic device.

77. The system of claim 76 wherein the reconfigurable logic device is further configured to perform the read operation and the DMA transfer operation.

* * * * *